United States Patent
Kim et al.

(10) Patent No.: US 10,574,333 B2
(45) Date of Patent: *Feb. 25, 2020

(54) METHOD AND APPARATUS FOR ALLOCATING RESOURCES IN A WIRELESS COMMUNICATION SYSTEM

(71) Applicant: LG ELECTRONICS INC., Seoul (KR)

(72) Inventors: Hakseong Kim, Anyang (KR); Dongyoun Seo, Anyang (KR); Hanbyul Seo, Anyang (KR); Daewon Lee, Anyang (KR); Byounghoon Kim, Anyang (KR); Kijun Kim, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

This patent is subject to a terminal disclaimer.

(21) Appl. No.: 14/924,330

(22) Filed: Oct. 27, 2015

(65) Prior Publication Data

US 2016/0197666 A1    Jul. 7, 2016

Related U.S. Application Data

(63) Continuation of application No. 13/635,009, filed as application No. PCT/KR2011/002633 on Apr. 13, 2011, now Pat. No. 9,197,363.

(Continued)

(30) Foreign Application Priority Data

Apr. 13, 2011    (KR) .................. 10-2011-0034204

(51) Int. Cl.
*H04B 7/14*    (2006.01)
*H04L 5/00*    (2006.01)
(Continued)

(52) U.S. Cl.
CPC ............. *H04B 7/14* (2013.01); *H04L 1/0046* (2013.01); *H04L 5/0048* (2013.01);
(Continued)

(58) Field of Classification Search
USPC ....... 370/229, 230, 235, 236, 252, 312, 328, 370/390, 395.4, 432, 315, 501
See application file for complete search history.

(56) References Cited

U.S. PATENT DOCUMENTS 7,558,230 B2    7/2009  Lee et al.
7,680,094 B2    3/2010  Liu
(Continued)

FOREIGN PATENT DOCUMENTS

CN              101039297 A      9/2007
KR      10-2010-0014190 A      2/2010
(Continued)

OTHER PUBLICATIONS

LG Electronics Inc., "Backhaul Control Channel Design in Downlink", TSG-RAN WG1 Meeting #61, R1-102700, May 10-14, 2010, pp. 1-5.

(Continued)

*Primary Examiner* — Kwang B Yao
*Assistant Examiner* — Nguyen H Ngo
(74) *Attorney, Agent, or Firm* — Birch, Stewart, Kolasch & Birch, LLP

(57) ABSTRACT

A method for receiving a relay physical downlink control channel (R-PDCCH) at a relay in a wireless communication system is discussed. The method according to one embodiment includes receiving first control information for downlink scheduling in a first slot of a set of resource block (RB) pairs. The first control information includes allocation information on one or more resource units. The method according to the embodiment further includes monitoring second con- (Continued)

trol information in a second slot of the set of RB pairs. If the R-PDCCH is assigned to the second slot of the set of RB pairs, the R-PDCCH is configured to carry control information for uplink scheduling.

5 Claims, 43 Drawing Sheets

Related U.S. Application Data

(60) Provisional application No. 61/323,842, filed on Apr. 13, 2010, provisional application No. 61/324,304, filed on Apr. 15, 2010, provisional application No. 61/327,086, filed on Apr. 22, 2010, provisional application No. 61/334,159, filed on May 12, 2010, provisional application No. 61/334,101, filed on May 12, 2010, provisional application No. 61/334,186, filed on May 13, 2010, provisional application No. 61/346,008, filed on May 18, 2010, provisional application No. 61/349,211, filed on May 28, 2010, provisional application No. 61/351,302, filed on Jun. 4, 2010.

(51) Int. Cl.
  *H04L 1/00* (2006.01)
  *H04W 72/12* (2009.01)
  *H04W 72/04* (2009.01)
  *H04W 88/02* (2009.01)
  *H04B 7/155* (2006.01)

(52) U.S. Cl.
  CPC ......... *H04L 5/0053* (2013.01); *H04W 72/042* (2013.01); *H04W 72/1289* (2013.01); *H04B 7/15507* (2013.01); *H04W 88/02* (2013.01)

(56) References Cited

U.S. PATENT DOCUMENTS

| | | | | |
|---|---|---|---|---|
| 8,929,303 B2* | 1/2015 | Wang | ............... | H04B 7/15507 370/329 |
| 9,197,363 B2* | 11/2015 | Kim | ............... | H04W 72/1289 |
| 2002/0080719 A1 | 6/2002 | Parkvall et al. | | |
| 2005/0068990 A1 | 3/2005 | Liu | | |
| 2005/0152279 A1 | 7/2005 | Robertson et al. | | |
| 2008/0220788 A1 | 9/2008 | Stanwood et al. | | |
| 2009/0003274 A1* | 1/2009 | Kwak | ............... | H04W 72/042 370/329 |
| 2010/0034135 A1 | 2/2010 | Kim et al. | | |
| 2010/0034299 A1* | 2/2010 | Love | ............... | H04L 5/0048 375/260 |
| 2010/0158142 A1 | 6/2010 | Yu et al. | | |
| 2010/0232546 A1* | 9/2010 | Yu | ............... | H04W 72/0413 375/300 |
| 2010/0275083 A1* | 10/2010 | Nam | ............... | H03M 13/6306 714/748 |
| 2010/0316096 A1* | 12/2010 | Adjakple | ............... | H04L 1/1887 375/211 |
| 2010/0329220 A1 | 12/2010 | Kim et al. | | |
| 2011/0064159 A1* | 3/2011 | Ko | ............... | H04B 7/04 375/267 |
| 2011/0069637 A1* | 3/2011 | Liu | ............... | H04L 5/0007 370/254 |
| 2011/0103292 A1* | 5/2011 | Pasad | ............... | H04B 7/155 370/315 |
| 2011/0103295 A1* | 5/2011 | Khandekar | ............... | H04W 72/04 370/315 |
| 2011/0170496 A1* | 7/2011 | Fong | ............... | H04L 5/0053 370/329 |
| 2011/0194412 A1 | 8/2011 | Park et al. | | |
| 2011/0211551 A1* | 9/2011 | Parkvall | ............... | H04L 5/0053 370/330 |
| 2011/0211595 A1* | 9/2011 | Geirhofer | ............... | H04B 7/155 370/478 |
| 2011/0222491 A1* | 9/2011 | Vajapeyam | ............... | H04L 1/0038 370/329 |
| 2011/0243059 A1* | 10/2011 | Liu | ............... | H04L 1/0046 370/315 |
| 2011/0249640 A1* | 10/2011 | Soong | ............... | H04B 7/2606 370/329 |
| 2011/0268032 A1* | 11/2011 | Kim | ............... | H04L 1/1671 370/328 |
| 2012/0020310 A1* | 1/2012 | Ji | ............... | H04W 48/16 370/329 |
| 2012/0099518 A1 | 4/2012 | Park et al. | | |
| 2012/0163335 A1* | 6/2012 | Chung | ............... | H04L 5/0023 370/330 |
| 2012/0218964 A1* | 8/2012 | Park | ............... | H04B 7/155 370/329 |
| 2014/0362743 A1 | 12/2014 | Park et al. | | |

FOREIGN PATENT DOCUMENTS

| | | |
|---|---|---|
| KR | 10-2010-0018453 A | 2/2010 |
| KR | 10-2010-0032813 A | 3/2010 |
| WO | WO 2009/116789 A1 | 9/2009 |
| WO | WO 2010/039003 A2 | 4/2010 |
| WO | WO 2010/126275 A2 | 11/2010 |
| WO | WO 2011/087136 A1 | 7/2011 |
| WO | WO 2011/126247 A2 | 10/2011 |

OTHER PUBLICATIONS

Qualcomm Incorporated, "R-PDCCH Design", 3GPP TSG-RAN WG1 #60bis, R1-102344, Apr. 12-16, 2010, pp. 1-7.

* cited by examiner

FIG. 22
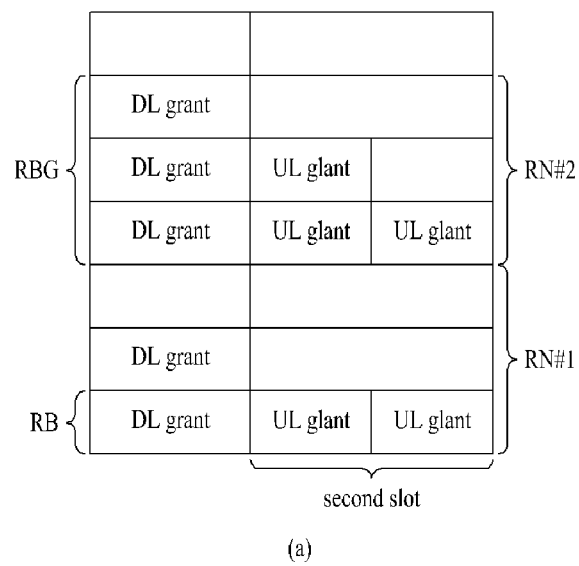
(a)
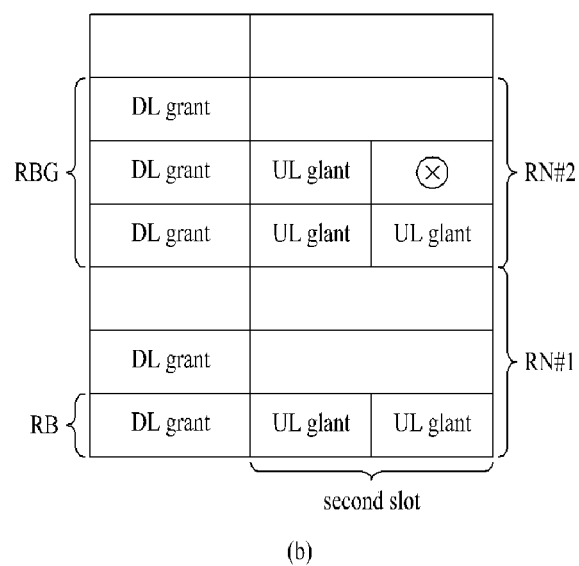
(b)

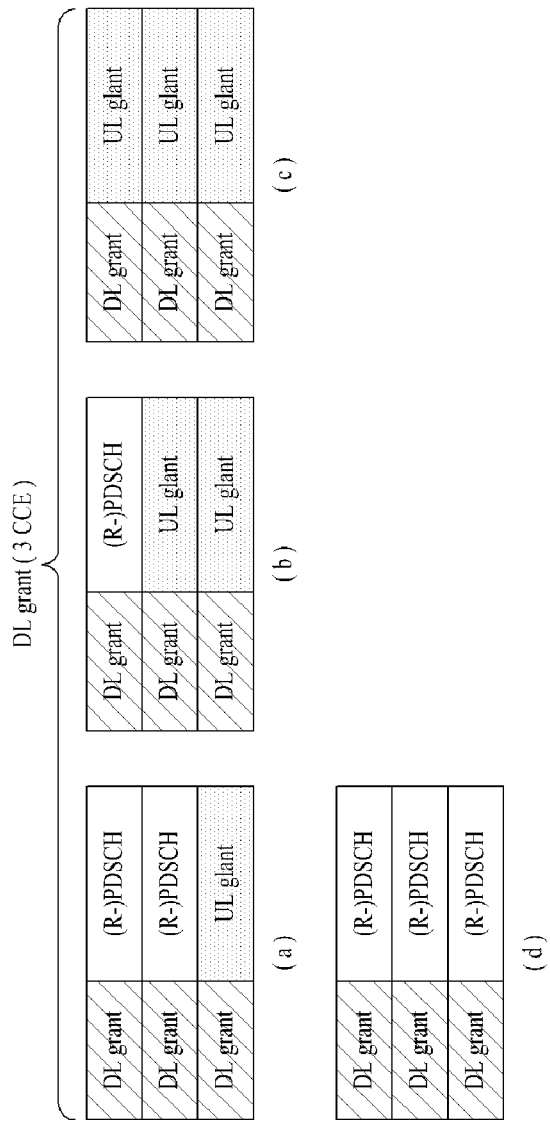

FIG. 28

DCI format 0:

| 0 UL | 0/1A | FH | N_UL_hop (1 or 2bit) | Ceil(log2(N/(N+1)/2)) | MCS/RV (5bit) | NDI | TPC (2bit) | DM RS CS (3bit) | CQI req. | ZP |
|---|---|---|---|---|---|---|---|---|---|---|

DCI format 1/1A/1B/1C:

| 1 1port/TXD | RA Hdr. | Ceil (N/P) | | MCS (5bit) | | HARQ (3bit) | NDI | RV (2bit) | TPC (2bit) | | |
|---|---|---|---|---|---|---|---|---|---|---|---|

| 1A 1port/TXD | 0/1A | L/D VRB | Ceil(log2(N/(N+1)/2)) | | MCS (5bit) | | HARQ (3bit) | NDI | RV (2bit) | TPC (2bit) | |
|---|---|---|---|---|---|---|---|---|---|---|---|

| 1B CL SM 1L | L/D VRB | Ceil(log2(N/(N+1)/2)) | MCS (5bit) | HARQ (3bit) | NDI | RV (2bit) | TPC (2bit) | TPMI (2 or 4bit) | Conf |
|---|---|---|---|---|---|---|---|---|---|

| 1D MU-MIMO | L/D VRB | Ceil(log2(N/(N+1)/2)) | MCS (5bit) | HARQ (3bit) | NDI | RV (2bit) | TPC (2bit) | TPMI (2 or 4bit) | Pw Offset |
|---|---|---|---|---|---|---|---|---|---|

DCI format 1/1A/1B/1C:

| 2 CL SM | RA Hdr. | Ceil (N/P) | TPC (2bit) | HARQ (3bit) | TB swap | MCS 1 (5bit) | NDI1 | RV1 (2bit) | MCS 2 (5bit) | NDI2 | RV2 (2bit) | Precoding info. (3 or 6 bits) |
|---|---|---|---|---|---|---|---|---|---|---|---|---|

| 2A LD CDD | RA Hdr. | Ceil (N/P) | TPC (2bit) | HARQ (3bit) | TB swap | MCS 1 (5bit) | NDI1 | RV1 (2bit) | MCS 2 (5bit) | NDI2 | RV2 (2bit) | Rank (0 or 2 bits) |
|---|---|---|---|---|---|---|---|---|---|---|---|---|

| 2B Dual L BF | RA Hdr. | Ceil (N/P) | TPC (2bit) | HARQ (3bit) | Scrbl ID | MCS 1 (5bit) | NDI1 Ant P | RV1 (2bit) | MCS 2 (5bit) | NDI2 Ant P | RV2 (2bit) | |
|---|---|---|---|---|---|---|---|---|---|---|---|---|

METHOD AND APPARATUS FOR ALLOCATING RESOURCES IN A WIRELESS COMMUNICATION SYSTEM

CROSS-REFERENCE TO RELATED APPLICATIONS

This application is a Continuation of U.S. application Ser. No. 13/635,009 filed on Sep. 14, 2012, which is the National Phase of PCT/KR2011/002633 filed on Apr. 13, 2011, which claims priority under 35 U.S.C. § 119(e) to U.S. Provisional Application Nos. 61/323,842 filed on Apr. 13, 2010, 61/324, 304 filed on Apr. 15, 2010, 61/327,086 filed on Apr. 22, 2010, 61/334,159 filed on May 12, 2010, 61/334,101 filed on May 12, 2010, 61/334,186 filed on May 13, 2010, 61/346, 008 filed on May 18, 2010, 61/349,211 filed on May 28, 2010, 61/351,302 filed on Jun. 4, 2010, and under 35 U.S.C. § 119(a) to Patent Application No. 10-2011-0034204 filed in the Republic of Korea on Apr. 13, 2011, all of which are hereby expressly incorporated by reference into the present application.

BACKGROUND OF THE INVENTION

1. Field of the Invention

The present invention relates to a radio communication system, and more particularly, to a method and device for receiving a downlink signal.

2. Description of the Related Art

Radio communication systems have been diversified in order to provide various types of communication services such as voice or data service. In general, a radio communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

SUMMARY OF THE INVENTION

An object of the present invention is to provide a method and device for efficiently utilizing downlink resources in a radio communication system.

The technical problems solved by the present invention are not limited to the above technical problems and other technical problems which are not described herein will become apparent to those skilled in the art from the following description.

According to an aspect of the present invention, A method for receiving downlink signal in a wireless communication system, the method comprising: receiving first control information for downlink scheduling in the first slot of a resource block (RB) pair, wherein the first control information includes allocation information on one or more resource units; receiving data at the second slot of the RB pair when the allocation information on a resource unit including the resource block pair with the first control information has a first value; and attempting to detect second control information for uplink scheduling at the second slot of the RB pair when the allocation information on the resource unit including the resource block pair with the first control information has a second value.

According to other aspect of the present invention, An user equipment configured to receive a downlink signal in a wireless communication system, the apparatus comprising: a radio frequency unit; and a processor, wherein the processor is configured to receive first control information for downlink scheduling in the first slot of a resource block (RB) pair, wherein the first control information includes allocation information on one or more resource units, and to receive data at the second slot of the RB pair when the allocation information on a resource unit including the resource block pair with the first control information has a first value, and to attempt to detect second control information for uplink scheduling at the second slot of the RB pair when the allocation information on the resource unit including the resource block pair with the first control information has a second value.

Preferably, the resource unit allocation information includes bitmap for resource allocation, each bit indicating resource allocation of a corresponding RB or a RBG (Resource Block Group).

Preferably, the second control information exists on the second slot of the RB pair when the allocation information on the resource unit including the resource block pair with the first control information has the second value.

Preferably, the first value is 1, and the second value is 0.

Preferably, the attempting to detect the second control information is performed under an assumption that an aggregation level of the second control information is less than a control level of the first control information.

Preferably, the attempting to detect the second control information is performed only on resource overlapped between pre-configured search space for the second control information and the resource unit for which the allocation information has the second value.

Preferably, further comprising: receiving information related to arrangement of the second control information on resources of the second slot via an upper layer signaling.

According to a communication system of the present invention, it is possible to efficiently utilize downlink resources in a radio communication system.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 20 to 23 are diagrams showing other examples of placing and demodulating R-PDCCHs/(R-)PDSCHs.

FIG. 28 is a diagram showing a downlink control information (DCI) format.

DETAILED DESCRIPTION OF THE INVENTION

The configuration, the operation and the other features of the embodiments of the present invention will be described with reference to the accompanying drawings. The following embodiments of the present invention may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A $3^{rd}$ Generation Partnership Project Long Term Evolution (3GPP LTE) communication system is part of the E-UMTS (Evolved UMTS) which employs the E-UTRA. The LTE-Advanced (LTE-A) is an evolved version of the 3GPP LTE.

The following embodiments focus on the 3GPP system to which the technical features of the present invention are applied, but the present invention is not limited thereto.

Figure 1:
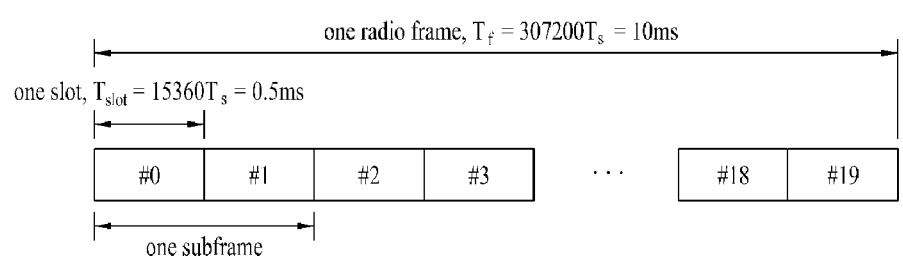
FIG. 1 is a diagram showing the structure of a radio frame used in a 3$^{rd}$ Generation Partnership Project (3GPP) system.

FIG. 1 is a diagram showing the structure of a radio frame of a $3^{rd}$ Generation Partnership Project (3GPP) system.

Referring to FIG. 1, the radio frame has a length of 10 ms (307200·$T_s$) and includes 10 subframes with the same size. Each of the subframes has a length of 1 ms and includes two slots. Each of the slots has a length of 0.5 ms (15360·$T_s$). $T_s$ denotes a sampling time, and is represented by $T_s=1/(15 \text{ kHz} \times 2048)=3.2552\times10^{-8}$ (about 33 ns). Each slot includes a plurality of OFDM symbols or SC-FDMA symbols in a time domain, and includes a plurality of resource blocks (RBs) in a frequency domain. In the LTE system, one RB includes 12 subcarriers×7(6) OFDM symbols. A Transmission Time Interval (TTI) which is a unit time for transmission of data may be determined in units of one or more subframes. The structure of the radio frame is only exemplary and the number of subframes, the number of subslots, or the number of OFDM/SC-FDMA symbols may be variously changed in the radio frame.

Figure 2:
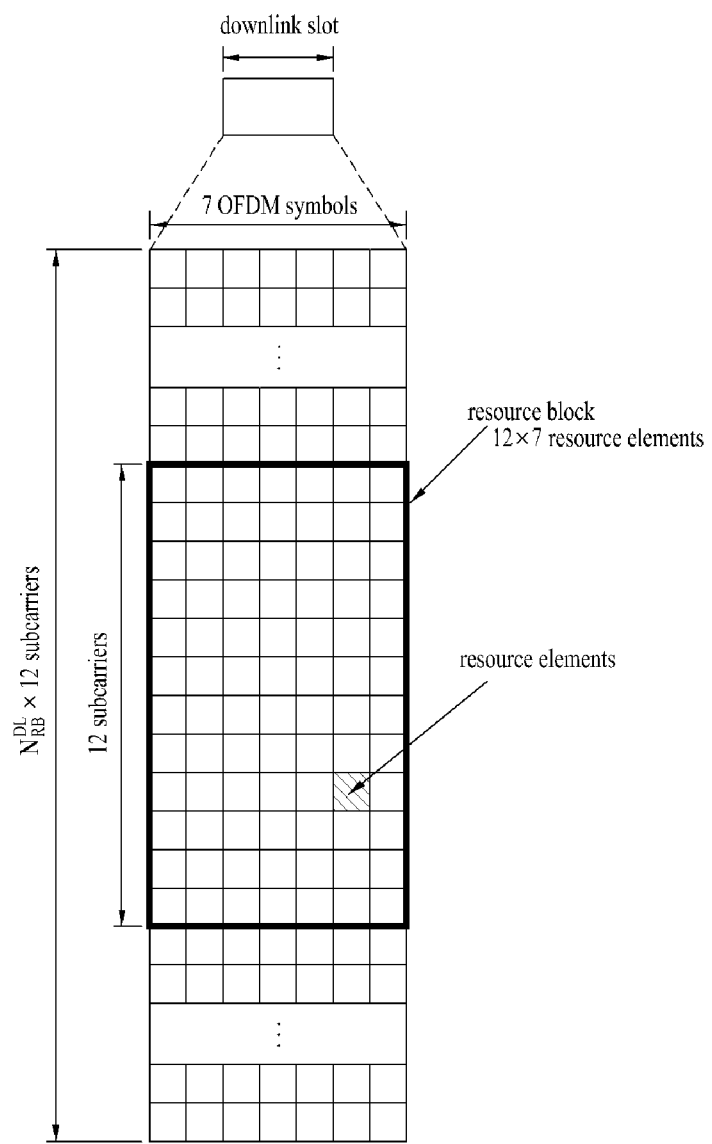
FIG. 2 is a diagram showing a resource grid of a downlink slot.

FIG. 2 is a diagram showing a resource grid of a downlink slot.

Referring to FIG. 2, a downlink slot includes a plurality of OFDM symbols (e.g., seven) in a time domain and $N^{DL}_{RB}$ RBs in a frequency domain. Since each RB includes 12 subcarriers, the downlink slot includes $N^{DL}_{RB} \times 12$ subcarriers in the frequency domain. Although FIG. 2 shows the case in which the downlink slot includes seven OFDM symbols and the RB includes 12 subcarriers, the present invention is not limited thereto. For example, the number of OFDM symbols included in the downlink slot may be changed according to the length of a cyclic prefix (CP). Each element of the resource grid is referred to as a resource element (RE). The RE is a minimum time/frequency resources defined in a physical channel and is indicated by one OFDM symbol index and one subcarrier index. One RB includes $N^{DL}_{symb} \times N^{RB}_{sc}$ REs. $N^{DL}_{symb}$ denotes the number of OFDM symbols in the downlink slot and $N^{RB}_{sc}$ denotes the number of subcarriers included in the RB. The number $N^{DL}_{RB}$ of RBs included in the downlink slot depends on a downlink transmission bandwidth set in a cell.

The downlink slot structure shown in FIG. 2 is equally applied to an uplink slot structure. At this time, the uplink slot structure includes SC-FDMA symbols, instead of the OFDM symbols.

Figure 3:
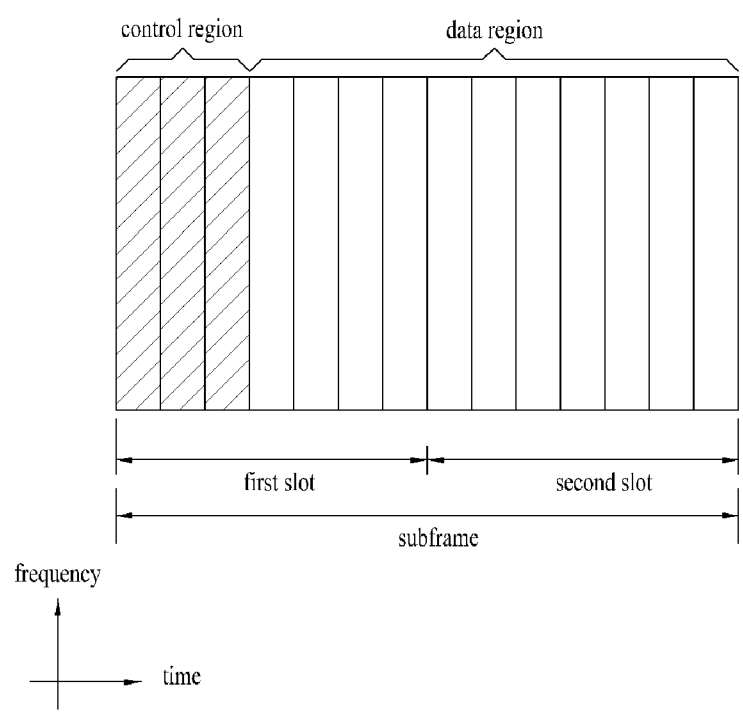
FIG. 3 is a diagram showing the structure of a downlink subframe.

FIG. 3 is a diagram showing the structure of a downlink subframe in a 3GPP system.

Referring to FIG. 3, one or more OFDM symbols located in a front portion of the subframe are used as a control region and the remaining OFDM symbols are used as a data region. The size of the control region may be independently set per subframe. The control region is used to transmit scheduling information and layer 1/layer 2 (L1/L2) control information. The data region is used to transmit traffic. The control channel includes a Physical Control Format Indicator Channel (PCFICH), a Physical Hybrid automatic repeat request (ARQ) Indicator Channel (PHICH), a Physical Downlink Control Channel (PDCCH), etc. The traffic channel includes a Physical Downlink Shared Channel (PDSCH).

The PDCCH may inform a UE or a UE group of resource allocation information about resource allocation of a paging channel (PCH) or a Downlink Shared Channel (DL-SCH) which is a transport channel, uplink scheduling grant, HARQ information, etc. The PCH and the DL-SCH are transmitted through a PDSCH. Accordingly, an eNode B and a UE generally transmit and receive data through a PDSCH except for specific control information or specific service data. Control information transmitted through a PDCCH is referred to downlink control information (DCI). The DCI indicates uplink resource allocation information, downlink resource allocation information and an uplink transmit power control command for arbitrary UE groups. The eNode B decides a PDCCH format according to DCI to be sent to the UE and attaches a cyclic redundancy check (CRC) to control information. The CRC is masked with a unique identifier (e.g., a Radio Network Temporary Identifier (RNTI)) according to an owner or usage of the PDCCH.

Figure 4:
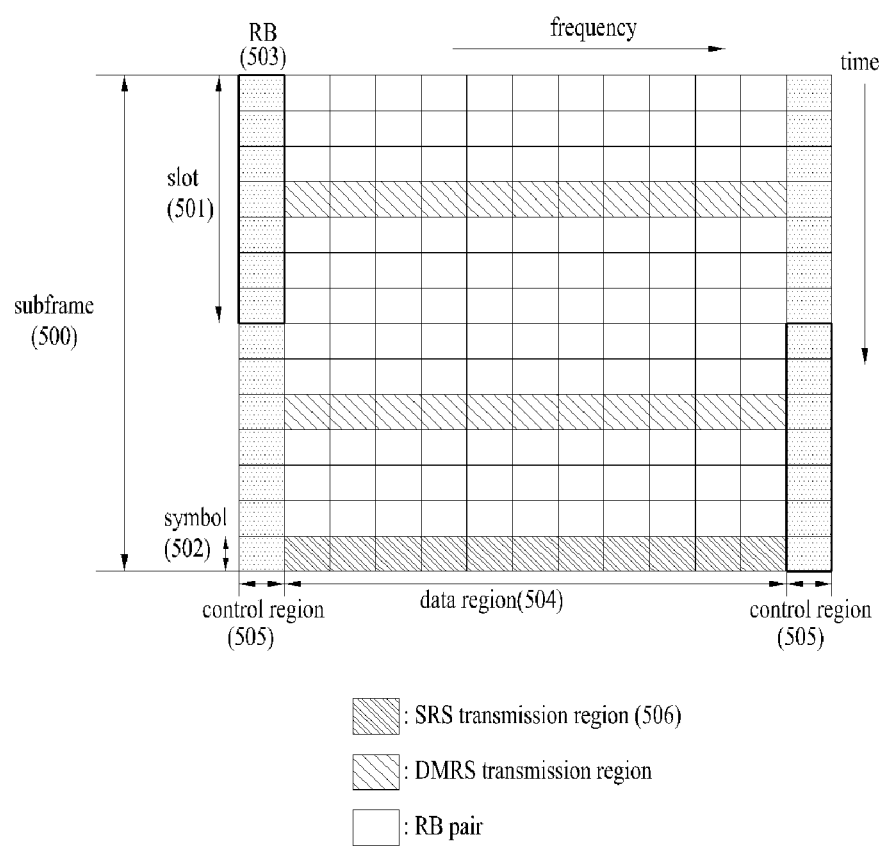
FIG. 4 is a diagram showing the structure of an uplink subframe used in a system.

FIG. 4 is a diagram showing the structure of an uplink subframe used in a 3GPP system.

Referring to FIG. 4, a subframe 500 having a length of 1 ms which is a basic unit of LTE uplink transmission includes two slots 501 each having a length of 0.5 ms. In the case of a length of a normal Cyclic Prefix (CP), each slot includes seven symbols 502 and one symbol corresponds to one Single carrier-Frequency Division Multiple Access (SC-FDMA) symbol. An RB 503 is a resource allocation unit corresponding to 12 subcarriers in a frequency domain and one slot in a time domain. The structure of the uplink subframe of the LTE system is roughly divided into a data region 504 and a control region 505. The data region refers to communication resources used for data transmission, such as voice or packets transmitted to each UE, and includes a physical uplink shared channel (PUSCH). The control region refers to communication resources used to transmit an uplink control signal such as a downlink channel quality report from each UE, reception ACK/NACK of a downlink signal, an uplink scheduling request or the like, and includes a Physical Uplink Control Channel (PUCCH). A sounding reference signal (SRS) is transmitted through a last SC-FDMA symbol of one subframe on a time axis. SRSs of several UEs transmitted through the last SC-FDMA of the same subframe are distinguished according to a frequency position/sequence.

Figure 5:
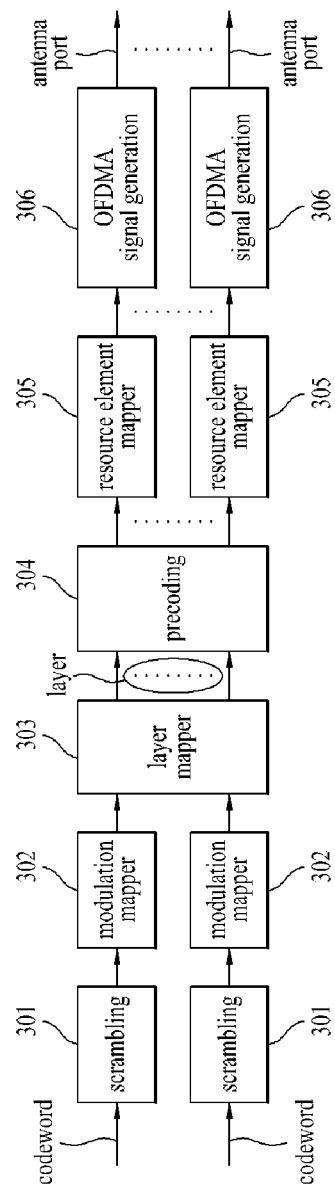
FIG. 5 is a diagram showing a process of transmitting a signal using a multi-antenna scheme.

FIG. 5 is a diagram showing a process of transmitting a signal using a multi-antenna scheme.

Referring to FIG. 5, codewords are scrambled by scrambling modules 301. The codeword includes an encoded bit stream corresponding to a transport block. The scrambled codewords are input to modulation mappers 302 and are modulated into complex symbols using a Binary Phase Shift Keying (BPSK), Quadrature Phase Shift Keying (QPSK) or 16-Quadrature amplitude modulation (QAM) scheme according to the kind of the transmitted signal and/or the channel state. Thereafter, the modulated complex symbols are mapped to one or more layers by a layer mapper 303. Codeword-to-layer mapping may be changed according to a transmission scheme. The layer-mapped signals may be multiplied by a predetermined precoding matrix selected according to a channel state by a precoding module 304 to be allocated to transmission antennas. The signals to be transmitted by the antennas may be mapped to time-frequency resource elements to be used for transmission by the resource element mappers 305, and transmitted via OFDMA signal generator 306 and antennas.

Figure 6:
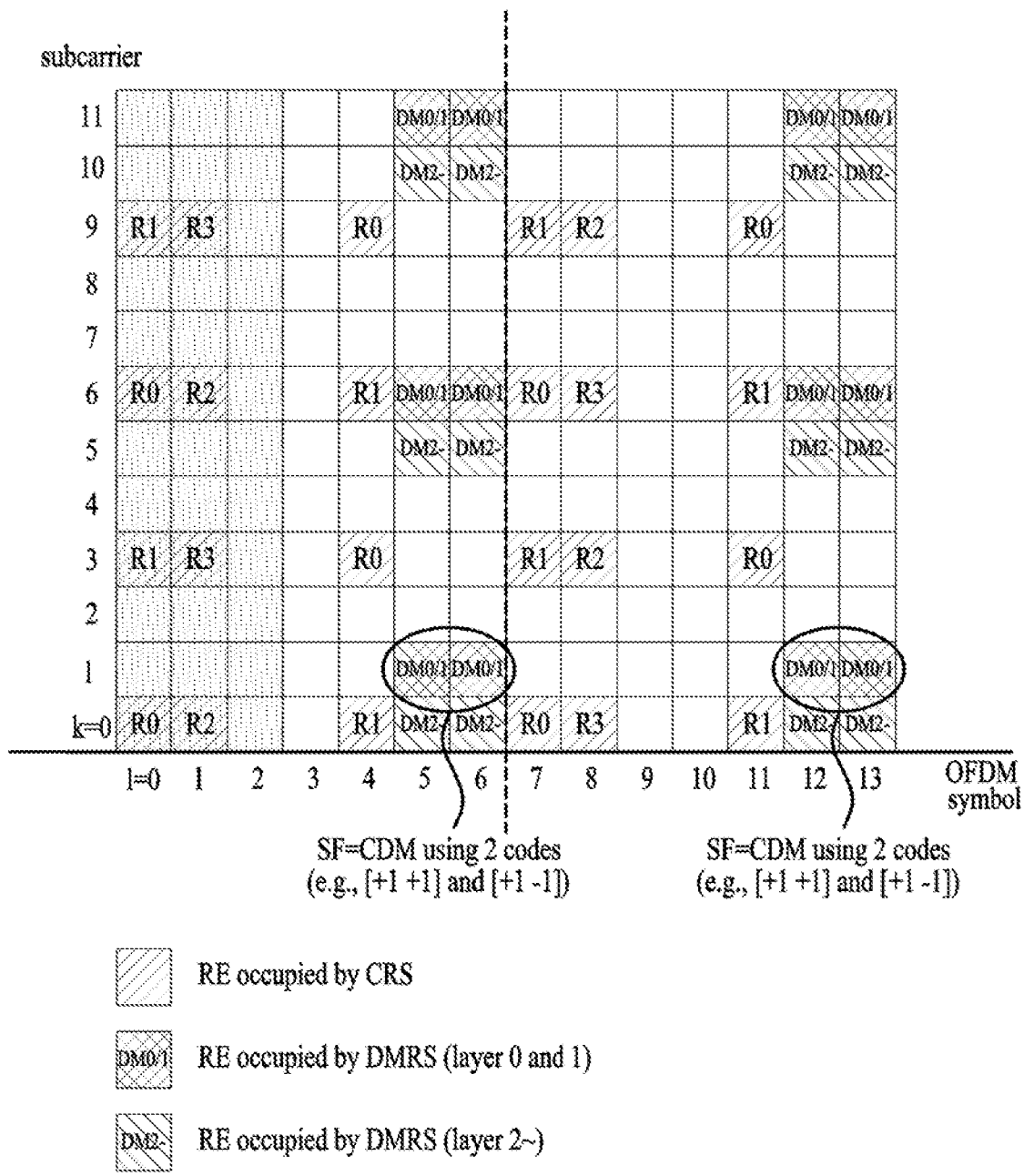
FIG. 6 is a diagram showing the structure of a demodulation reference signal (DM RS).

FIG. 6 is a diagram showing the structure of a demodulation reference signal (DM RS). The DM RS is a UE-specific RS used to demodulate a signal of each layer when a signal is transmitted using multiple antennas. The DM RS is used to demodulate a PDSCH and an R-PDSCH. Since an LTE-A system includes a maximum of eight transmission antennas, a maximum of eight layers and DM RSs therefor are necessary. For convenience, DM RSs for layers 0 to 7 are referred to as DM RSs (layers) 0 to 7.

Referring to FIG. 6, the DM RSs for two or more layers share the same RE and are multiplexed according to a code division multiplexing (CDM) scheme. More specifically, DM RSs for layers are spread using spreading codes (e.g., Walsh codes or orthogonal codes such as DFT codes) and are multiplexed on the same RE. For example, DM RSs for layers 0 and 1 share the same RE and are, for example, spread on two REs of OFDM symbols 12 and 13 at a subcarrier 1 (k=1) using orthogonal coding. That is, in each slot, the DM RSs for layers 0 and 1 are spread along a time axis using codes having a spreading factor (SF) of 2 and are multiplexed on the same REs. For example, the DM RS for the layer 0 may be spread using [+1 +1] and the MD RS for the layer 1 may be spread using [+1 −1]. Similarly, the DM RSs for layers 2 and 3 are spread on the RE using different orthogonal codes. The DM RSs for layers 4, 5, 6 and 7 are spread on the REs occupied by the DM RSs for layers 0, 1, 2 and 3 using codes orthogonal to the layers 0, 1, 2 and 3. Codes having SF=2 is used for the DM RS if four or less layers are used and codes having SF=4 is used for the DM RS if five or more layers are used. In LTE-A, antenna ports for the DM RS is {7, 8, . . . , n+6} (n being the number of layers).

Table 1 shows a spread sequence for antenna ports 7 to 14 defined in LTE-A.

TABLE 1

| Antenna port p | [$\bar{w}_p(0)\ \bar{w}_p(1)\ \bar{w}_p(2)\ \bar{w}_p(3)$] |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Referring to Table 1, orthogonal code for antenna ports 7 to 10 has a structure in which orthogonal code having a length of 2 is repeated. As a result, orthogonal code having a length of 2 is used at a slot level if four or less layers are used and orthogonal code having a length of 4 is used at a subframe level if 5 or more layers are used.

Hereinafter, resource block mapping will be described. A physical resource block (PRB) and a virtual resource block (VRB) are defined. The PRB is equal to that shown in FIG. 2. That is, the PRB is defined as $N_{symb}^{DL}$ contiguous OFDM symbols in a time domain and $N_{sc}^{RB}$ contiguous subcarriers in a frequency domain. PRBs are numbered from 0 to $N_{RB}^{DL}-1$ in the frequency domain. A relationship between a PRB number $n_{PRB}$ and an RE (k, l) in a slot is shown in Equation 1.

$$n_{PRB} = \left\lfloor \frac{k}{N_{sc}^{RB}} \right\rfloor \quad \text{Equation 1}$$

where, k denotes a subcarrier index and $N_{sc}^{RB}$ denotes the number of subcarriers included in one RB.

The VRB has the same size as the PRB. A localized VRB (LVRB) of a localized type and a distributed VRB (DVRB) of a distributed type are defined. Regardless of the type of the VRB, a pair of RBs is allocated over two slots by a single VRB number $n_{VRB}$.

Figure 7:
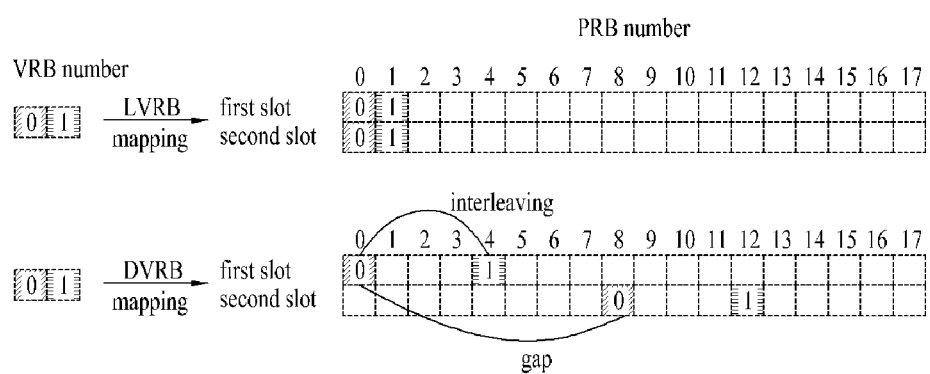
FIG. 7 is a diagram showing a method of mapping a virtual resource block (VRB) to a physical resource block (PRB).

FIG. 7 is a diagram showing a method of mapping a virtual resource block (VRB) to a physical resource block (PRB).

Referring to FIG. 7, since an LVRB is directly mapped to a PRB, a VRB number $n_{VRB}$ equally corresponds to a PRN number $n_{PRB}$ ($n_{PRB}=n_{VRB}$). The VRB is numbered from 0 to $N_{VRB}^{DL}-1$ and $N_{VRB}^{DL}=N_{RB}^{DL}$. The DVRB is mapped to the PRB after being interleaved. More specifically, the DVRB may be mapped to the PRB as shown in Table 2. Table 2 shows an RB gap value.

TABLE 2

| System BW ($N_{RB}^{DL}$) | Gap ($N_{gap}$) | |
|---|---|---|
| | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g., PRB unit) when VRBs having the same number are mapped to PRBs of a first slot and a second slot. In case of $6 \le N_{RB}^{DL} \le 49$, only one gap value is defined ($N_{gap}=N_{gap,1}$). In case of $50 \le N_{RB}^{DL} \le 110$, two gap values $N_{gap,1}$ and $N_{gap,2}$ are defined. $N_{gap}=N_{gap,1}$ or $N_{gap}=N_{gap,2}$ is signaled through downlink scheduling. DVRBs are numbered from 0 to $N_{VRB}^{DL}-1$, is $N_{VRB}^{DL}=N_{VRB,gap1}^{DL}=2 \cdot \min(N_{gap}, N_{RB}^{DL}-N_{gap})$ with respect to $N_{gap}=N_{gap,1}$, and is $N_{VRB}^{DL}=N_{VRB,gap,2}^{DL}=\lfloor N_{RB}^{DL}/2N_{gap} \rfloor \cdot 2N_{gap}$ with respect to $N_{gap}=N_{gap,2}$. min(A,B) denotes the smaller of A or B.

Contiguous $\tilde{N}_{VRB}^{DL}$ VRB numbers configure a unit for VRB number interleaving, is $\tilde{N}_{VRB}^{DL}=N_{VRB}^{DL}$ in case of $N_{gap}=N_{gap,1}$, and is $\tilde{N}_{VDR}^{DL}=2N_{gap}$ in case of $N_{gap}=N_{gap,2}$. VRB number interleaving of each interleaving unit may be performed using four columns and $N_{row}$ rows. $N_{row}=\lceil \tilde{N}_{VRB}^{DL}/(4P) \rceil \cdot P$ and P denotes the size of a Resource Block Group (RBG). The RBG is defined by P contiguous RBs. The VRB number is written in a matrix on a row-by-row basis and is read in a column-by-column basis. $N_{null}$ null values are inserted into last $N_{null}/2$ rows of second and fourth columns and $N_{null}=4N_{row}-\tilde{N}_{VRD}^{DL}$. The null value is ignored upon reading.

Figure 8:
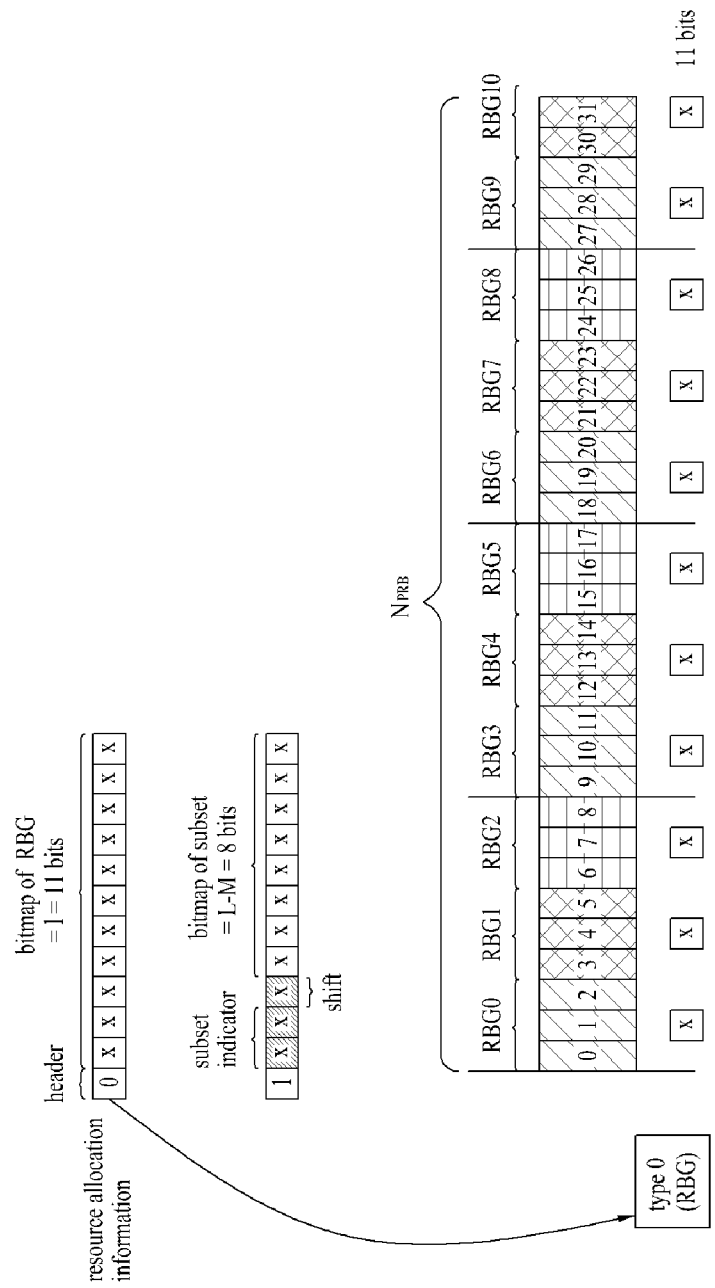
FIGS. 8 to 10 are diagrams showing Type 0 resource allocation (RA), Type 1 RA and Type 2 RA, respectively.
Figure 9:
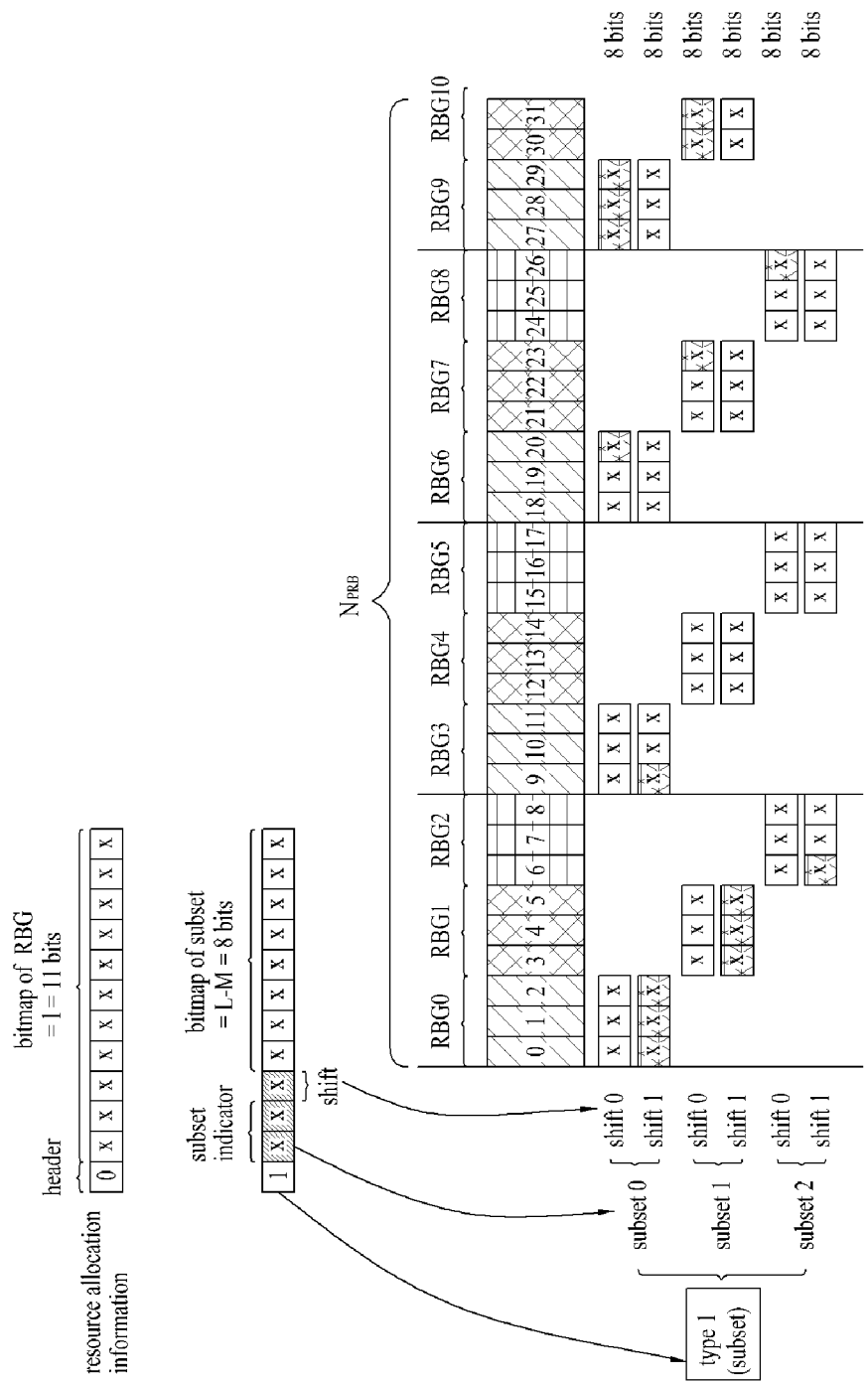
Figure 10:
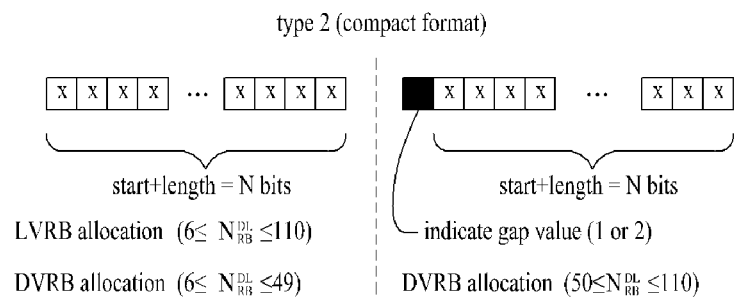

Hereinafter, resource allocation defined in LTE will be described. FIGS. 8 to 10 are diagrams showing control information formats for Type 0 resource allocation (RA), Type 1 RA and Type 2 RA and resource allocation examples thereof, respectively.

A user equipment (UE) interprets a resource allocation field based on a detected PDCCH DCI format. The resource allocation field in each PDCCH includes two parts: a resource allocation header field and actual resource block allocation information. PDCCH DCI formats 1, 2 and 2A for Type 0 and Type 1 RA have the same format and are distinguished via a single bit resource allocation header field present according to a downlink system bandwidth. More specifically, Type 0 RA is indicated by 0 and Type 1 RA is indicated by 1. While PDCCH DCI formats 1, 2 and 2A are used for Type 0 or Type 1 RA, PDCCH DCI formats 1A, 1b, 1C and 1D are used for Type 2 RA. The PDCCH DCI format having Type 2 RA does not have a resource allocation header field.

Referring to FIG. 8, in Type 0 RA, resource block allocation information includes a bitmap indicating an RBG allocated to a UE. The RBG is a set of contiguous PRBs. The size P of the RBG depends on a system bandwidth as shown in Table 3.

TABLE 3

| System Bandwidth $N_{RB}^{DL}$ | RBG Size (P) |
|---|---|
| ≤10 | 1 |
| 11-26 | 2 |
| 27-63 | 3 |
| 64-110 | 4 |

In a downlink system bandwidth having $N_{RB}^{DL}$, the total number $N_{RBG}$ of RBGs is $N_{RBG}=\lceil N_{RB}^{DL}/P \rceil$, the size of $\lfloor N_{RB}^{DL}/P \rfloor$ RBGs is P, and the size of one RBG is $N_{RB}^{DL}-P \cdot \lfloor N_{RB}^{DL}/P \rfloor$ in case of $N_{RB}^{DL}$ mod P>0. Mod denotes a modulo operation, $\lceil \ \rceil$ denotes a ceiling function, and $\lfloor \ \rfloor$ denotes a flooring function. The size of a bitmap is $N_{RBG}$ and each bit corresponds to one RBG. All RBGs are indexed by 0 to $N_{RBG}-1$ in a frequency increase direction and RBG 0 to RBG $N_{RBG}-1$ are mapped from a most significant bit (MSB) to a least significant bit (LSB) of a bitmap.

Referring to FIG. 9, in Type 1 RA, resource block allocation information having the size of $N_{RBG}$ informs a scheduled UE of resources in an RBG subset in PRB units. The RBG subset p (0≤p<P) starts from an RBG p and includes every P-th RBG. The resource block allocation information includes three fields. A first field has $\lceil \log_2(P) \rceil$ bits and indicates an RBG subset selected from among P RBG subsets. A second field has 1 bit and indicates resource allocation span shift within a subset. Shift is triggered if a bit value is 1 and is not triggered if a bit value is 0. A third field includes a bitmap and each bit indicates one PRB within a selected RBG set. The size of a bitmap part used to indicate a PRB within the selected RBG subset is $N_{RB}^{TYPE1}$ and is defined by Equation 2.

$$N_{RB}^{TYPE1}=\lfloor N_{RB}^{DL}/P \rfloor-\lceil \log_2(P) \rceil-1 \quad \text{Equation 2}$$

An addressable PRB number in the selected RBG subset may start from an offset $\Delta_{shift}$ (p) from a smallest PRB number within the selected RBG subset and may be mapped to a MSB of a bitmap. The offset is represented by the number of PRBs and is applied within the selected RBG subset. If the bit value within a second field for resource allocation span shift is set to 0, an offset for an RBG subset p is $\Delta_{shift}(p)=0$. In the other case, an offset for an RBG subset p is $\Delta_{shift}(p)=N_{RB}^{RBGsubset}(p)-N_{RB}^{TYPE1} \cdot N_{RB}^{RBGsubset}(p)$ denotes the number of PRBs within the RBG subset p and may be obtained by Equation 3.

$$N_{RB}^{RBGsubset}(p) = \quad \text{Equation 3}$$

$$\begin{cases} \lfloor \frac{N_{RB}^{DL}-1}{P^2} \rfloor \cdot P + P, & p < \lfloor \frac{N_{RB}^{DL}-1}{P} \rfloor \text{mod} P \\ \lfloor \frac{N_{RB}^{DL}-1}{P^2} \rfloor \cdot P + (N_{RB}^{DL}-1) \text{mod} P + 1, & p = \lfloor \frac{N_{RB}^{DL}-1}{P} \rfloor \text{mod} P \\ \lfloor \frac{N_{RB}^{DL}-1}{P^2} \rfloor \cdot P, & p > \lfloor \frac{N_{RB}^{DL}-1}{P} \rfloor \text{mod} P \end{cases}$$

Referring to FIG. 10, in Type 2 RA, resource block allocation information indicates an LVRB or DVRB set contiguously allocated to a scheduled UE. If resource allocation is signaled in PDCCH DCI format 1A, 1B or 1C, a 1-bit flag indicates whether an LVRB or DVRB is allocated (e.g., 0 denotes LVRB allocation and 1 denotes DVRB allocation). In contrast, if resource allocation is signaled in PDCCH DCI format 1C, only DVRB is always allocated. A Type 2 RA field includes a resource indication value (MV)

and the RIV corresponds to a start resource block $RB_{start}$ and a length. The length denotes the number of virtually and contiguously allocated resource blocks.

Figure 11:
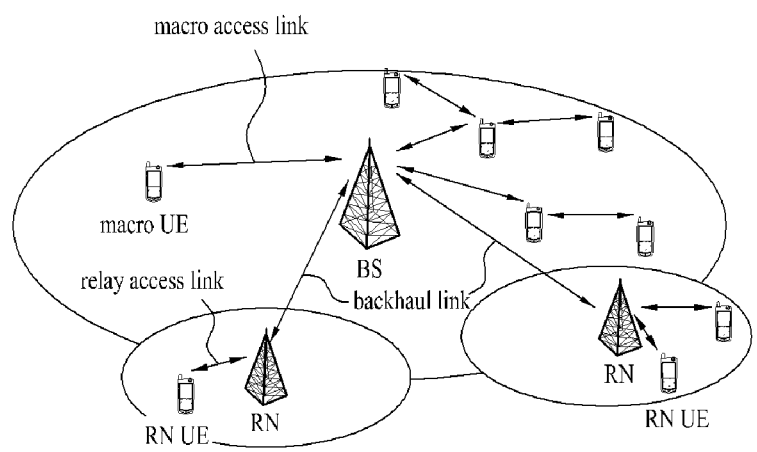
FIG. 11 is a diagram showing a radio communication system including a relay.

FIG. 11 is a diagram showing a communication system including a relay (or a relay node (RN)). The relay is installed in a shadow area so as to extend a service area of a base station and to improve a service. Referring to FIG. 11, a radio communication system includes a base station (BS), a relay and a UE. The UE performs communication with the base station or the relay. For convenience, a UE which performs communication with the base station is referred to as a macro UE and a UE which performs communication with the relay is referred to as a relay UE. A communication link between the base station and the macro UE is referred to as a macro access link and a communication link between the relay and the relay UE is referred to as a relay access link. In addition, a communication link between the base station and the relay is referred to as a backhaul link.

The relay may be divided into an L1 (layer 1) relay, an L2 (layer 2) relay and an L3 (layer 3) relay depending on how many functions are performed in multi-hop transmission. These relays will be briefly described. The L1 relay functions as a general repeater, amplifies a signal from a BS/UE and transmits the amplified signal to a UE/BS. Since the relay does not perform decoding, transmission delay is short, but a signal and noise cannot be distinguished and thus noise may be also amplified. In order to overcome this problem, an advanced repeater or a smart repeater having a UL power control function or a self-interference cancellation function may be used. The operation of the L2 relay may be represented by decode-and-forward and user plane traffic may be transmitted by the L2 relay. Noise is not amplified, but delay is increased due to decoding. The L3 relay is also referred to as self-backhauling and IP packets may be transmitted by the L3 relay. The L3 relay has a radio resource control functions as a small base station.

The L1 and L2 relay is a part of a donor cell covered by a BS. If the relay is a part of the donor cell, since the relay cannot control a cell thereof and UEs of the cell, the relay cannot have a cell ID thereof. However, the relay may have a relay ID. In this case, some functions of radio resource management (RRM) are controlled by the BS of the donor cell and a part of RRM may be located at the relay. The L3 relay can control a cell thereof. In this case, the relay may manage one or more cells and each cell managed by the relay may have a unique physical-layer cell ID. The relay may have the same RRM mechanism as the BS. From the viewpoint of the UE, it makes no difference whether the UE accesses the cell managed by the relay or the cell managed by the BS.

In addition, the relay is divided as follows according to mobility.

Fixed RN: This relay is permanently fixed and is used to increase cell coverage or to eliminate a shadow area and may function as a repeater.

Nomadic RN: This relay is temporarily installed when the number of users is abruptly increased and may be arbitrarily moved within a building.

Mobile RN: This relay may be installed in public transportation such as a bus or a subway and may be moved.

In addition, a link between a relay and a network is divided as follows.

In-band connection: A network-to-relay link and a network-to-UE link share the same frequency band within a donor cell.

Out-band connection: A network-to-relay link and a network-to-UE link use different frequency bands within a donor cell.

The relay is divided depending on whether a UE recognizes presence of the relay.

Transparent relay: The UE is not aware of whether communication with the network is performed via a relay.

Non-transparent relay: The UE is aware of whether communication with the network is performed via a relay.

Figure 12:
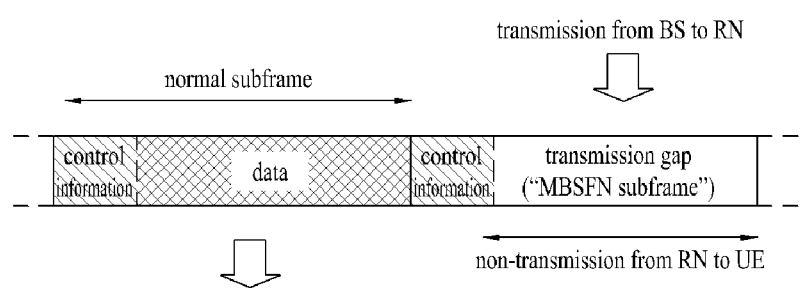
FIG. 12 is a diagram showing backhaul communication using a multimedia broadcast over a single frequency network (MBSFN) subframe.

FIG. 12 is a diagram showing backhaul communication using a multimedia broadcast over a single frequency network (MBSFN) subframe. In an in-band relay mode, a BS-relay link (that is, a backhaul link) and a relay-UE link (that is, a relay access link) operate in the same frequency band. If a relay transmits a signal to a UE while receiving a signal from a BS and vice versa, since a transmitter and a receiver of the relay cause interference, simultaneous transmission/reception of the relay may be prevented. In order to prevent simultaneous transmission/reception, a backhaul link and a relay access link are partitioned using a TDM scheme. In LTE-A, a backhaul link is set in an MBSFN subframe in order to support a measurement operation of a legacy LTE UE present in a relay zone (a fake MBSFN method). If an arbitrary subframe is signaled as an MBSFN subframe, since a UE receives only a control (ctrl) region of the subframe, a relay may configure a backhaul link using a data region of the subframe. For example, a relay PDCCH (R-PDCCH) is transmitted using a specific resource region from a third OFDM symbol to a last OFDM symbol of an MBSFN subframe.

Embodiment

Figure 13:
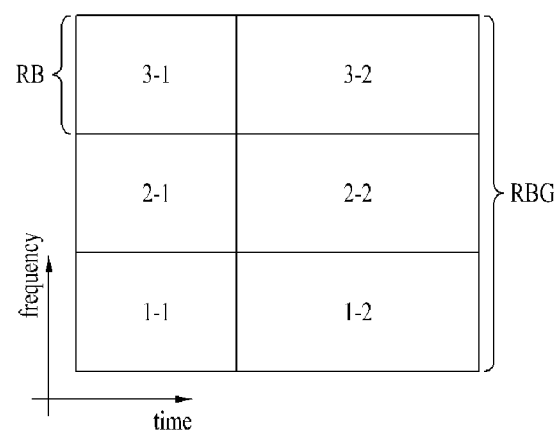
FIGS. 13 to 14 are diagrams showing arbitrary division of frequency-time resources.
Figure 14:
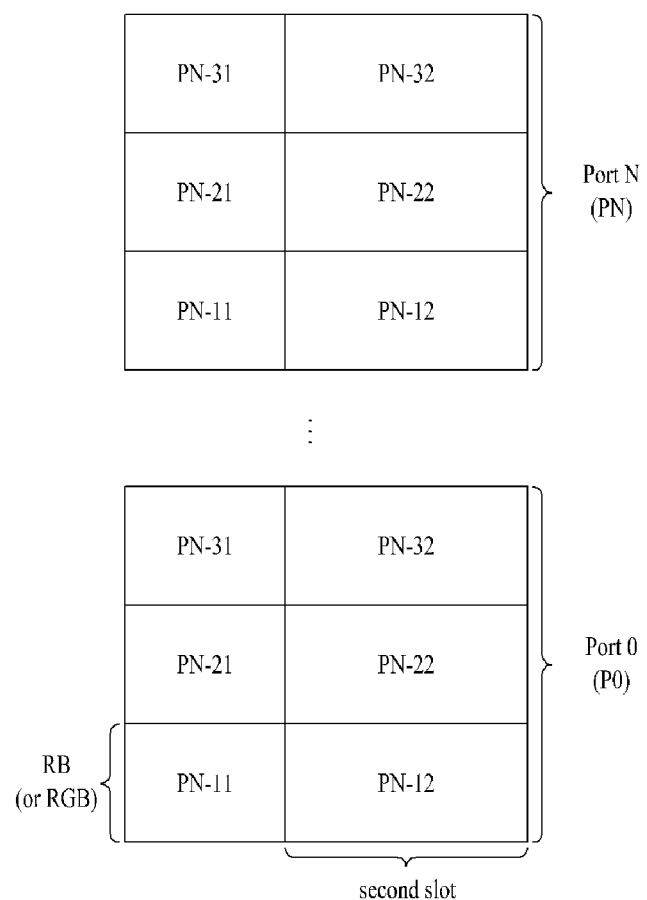

FIGS. 13 to 14 are diagrams showing arbitrary division of frequency-time resources. FIG. 13 shows the case of using a single antenna port and FIG. 14 shows the case of using multiple antenna ports. These figures show part of a downlink subframe.

In FIG. 13, the size of a frequency-time domain denoted by X-Y may be variously configured. In an LTE system, a resource region X-1 (X=1, 2, 3) may include 12 subcarriers in a frequency domain and four OFDM symbols in a time domain. A resource region X-2 (X=1, 2, 3) may include 12 subcarriers in a frequency domain and seven OFDM symbols in a time domain. The number of symbols may be changed according to the length of a cyclic prefix. The number of symbols and the number of subcarriers may have different values according to system. In other words, the resource region X-1 may be part of a first slot and the resource region X-2 may be part of a second slot. Such a resource configuration may typically appear in a backhaul subframe between a BS and a relay. In this case, FIG. 13 shows the remaining part of the MBSFN subframe of FIG. 12 except for the control information region.

FIG. 13 shows a resource block (RB) and a resource block group (RBG) in order to represent a resource size in a frequency domain. The RB is defined in slot units as shown in FIG. 2. Accordingly, X-Y corresponds to one RB and [X-1, X-2] corresponds to an RB pair. Unless specifically stated, the RB may be [X-1], [X-2] or [X-1, X-2] according to context. The RBG includes one or more contiguous RBs. Although the number of RBs configuring the RBG is 3 in FIG. 13, the number of RBs configuring the RBG may be changed according to a system bandwidth as shown in Table 3. The RB means a PRB or a VRB.

In FIG. 14, the size of the frequency domain and the size of the time domain in a resource region denoted by Px-yy (x, y=0, 1, 2, 3) may be variously configured. The basic resource configuration is equal to that described with reference to FIG. 13. In the figure, Pn (n=0, 1, 2, 3, . . . ) denotes a port or layer used in a multi-layer transmission system (e.g., an MIMO system). The port or layer means a distinguishable resource region capable of transmitting different information. The meaning of the port or layer may be differently interpreted according to system. For example, in a 3GPP LTE system, if P0-12 is one RB, P0-12 may include 12 subcarriers in the frequency domain and seven OFDM symbols in the time domain. If P0-12 is one RBG (e.g., RBG=4), the size of P0-12 in the frequency domain quadruples. A Px-y1 region includes REs, the number of which is equal to or less than the number of REs of a Px-y2 region. For example, if the Px-y1 resource region is one RB, the Px-y1 resource region may include 12 subcarriers and four OFDM symbols. If the Px-y1 resource region is one RBG, the size of the Px-y1 resource region in the frequency domain is increased by a multiple of the RBG unit. The Px-y1 region may mean a first slot or a part thereof and the Px-y2 region may mean a second slot or a part thereof. The number of symbols may be changed according to cyclic prefix length. The number of symbols and the number of subcarriers may have different values according to system.

Hereinafter, how control information and data are allocated and transmitted in the resource configuration shown in FIGS. 13 to 14 will be described. Unless specifically stated, a single antenna port will be focused upon and a resource region is represented by the method of FIG. 13, for convenience of description. It is apparent to those skilled in the art that the description of the single antenna port is applicable to multiple antenna ports.

Control information (e.g., R-PDCCH) used in a link between a BS and a relay is preferably transmitted in a predetermined specific resource region. In one example of the present invention, if Type 0 RA of LTE is used, a specific resource region (which is referred to as an R-PDCCH search space) in which control information may be transmitted may be restricted to K-th RBs of allocated RBG(s). Here, K denotes an integer less than the number of RBs configuring an RBG. In this case, the K-th RBs of all allocated RBGs may transmit an R-PDCCH. K may be a first RB or a last RB of an RGB group. Even in Type 1 or 2 RA, the concept of the RBG may be used and a specific RB of an RBG may be used as a resource region for R-PDCCH transmission in the tautological sense.

In addition, a method of separating RB(s) for the R-PDCCH search space from each other by the square of P within the RBG set if the R-PDCCH search space is set to one subset of an RBG set is proposed. Here, P is the number of RBs within an RBG. For example, assuming that the number of RBs is 32, 11 RBGs may be defined and one RBG may include three RBs (P=3). Accordingly, the RBs for the R-PDCCH search space may be placed at an interval of 3^2=9 RBs. The above-described example corresponds to the case in which one RBG subset is used and an interval of RBs within the subset is the square of P if the number of RBG subsets is 2. The interval between subsets may be changed depending on how many subsets are selected.

R-PDCCH/(R-)PDSCH Allocation and Demodulation

Control information is transmitted via an R-PDCCH and data is transmitted via an (R-)PDSCH. The R-PDCCH is roughly classified into two categories. One category is DL grant (DG) and the other category is UL grant (UG). The DL grant contains information about time/frequency/space resources of the R-PDSCH corresponding to data which should be received by a relay and information (scheduling information) for decoding. The UL grant contains information about time/frequency/space resources of the R-PUSCH corresponding to data which should be transmitted by a relay in uplink and information (scheduling information) for decoding. Hereinafter, a method of placing DL/UL grant in a resource region of a backhaul subframe and demodulating the DL/UL grant will be described.

Figure 15:
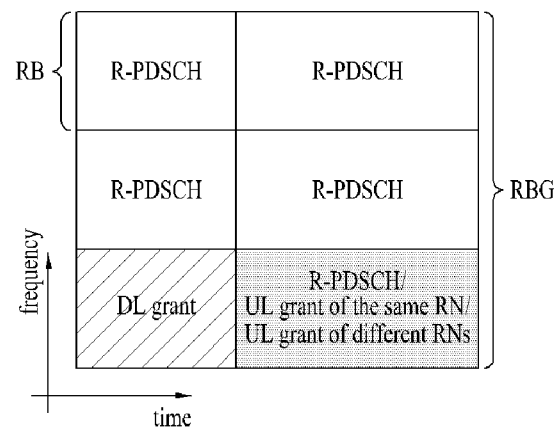
FIGS. 15 to 17 are diagrams showing examples of placing and demodulating an R-PDCCH/(R-)PDSCH.

FIG. 15 shows an example of placing and demodulating an R-PDCCH/(R-)PDSCH. In this example, it is assumed that resources for the (R-)PDSCH are allocated using Type 0 RA (RBG unit allocation) of the LTE. However, this example is merely exemplary and is equally/similarly applied to even the case in which Type 1 RA (RB unit allocation) of LTE is used. Although the case in which an RBG including DL grant is allocated to a relay is shown in FIG. 15, this is merely exemplary and the RBG including DL grant may not be allocated to the relay.

FIG. 15 shows the case in which (a) data ((R-)PDSCH) is present, (b) UL grant is present, or (c) UL grant for another relay is present in a resource region 1-2 in the case in which DL grant of RN #1 is present in a resource region 1-1.

In FIG. 15, a determination as to which information of (a) to (c) is present in the resource region 1-2 may be made using RA information (e.g., RBG or RB allocation information). For example, if all RBGs are allocated to RN #1, RN #1 may interpret RA information of DL grant and determine whether the resource region 1-2 corresponds to (a) or (b). More specifically, if data is present in an RB or an RBG in which a first R-PDCCH (e.g., DL grant) thereof is detected is present in the resource region X-1, RN #1 may assume that data thereof is present in resources other than resources occupied by the first R-PDCCH. Accordingly, if RA information indicates that data is present in the RB or RBG, RN #1 may determine that another R-PDCCH is not present in the RB or RBG except for DL grant. That is, the relay may determine that the resource region 1-2 corresponds to (a). If the RA information indicates that data is not present in the RB or RBG, the relay may determine that a second R-PDCCH is present as in (b) or (c) and detect an appropriate data start point (e.g., a resource region 2-1). At this time, the BS and the relay may assume that the size of the second R-PDCCH is constant. In case of (c), by attempting CRC detection based on an RN ID, it may be determined that the second R-PDCCH is not UL grant for RN #1. Although RA information is used to distinguish among (a), (b) and (c), it may be implicitly set that the RBG including DL grant is always resources allocated for data of RN #1 in advance.

Although FIG. 15 shows the case in which DL grant is present in the whole resource region X-1 (e.g., 1-1), this is merely exemplary and the above-described method may be equally applied to the case in which DL grant is present in a part of the resource region 1-1. Although FIG. 15 shows the case in which DL grant is present in the resource region X-1, UL grant may be present in the resource region X-1 instead of DL grant. In this case, the relay may first decode UL grant instead of DL grant. Although the second R-PDCCH is UL grant in FIG. 15, this is merely exemplary and the second R-PDCCH may be DL grant.

Figure 16:
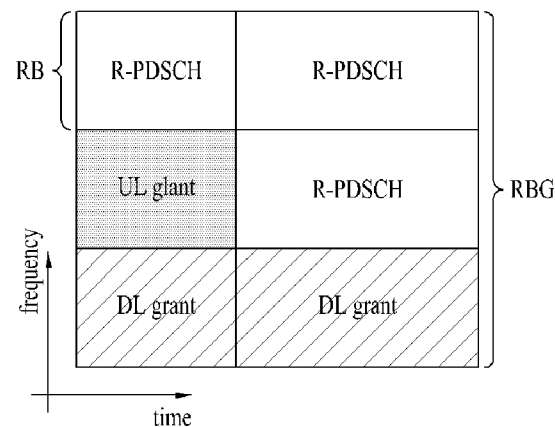
Figure 17:
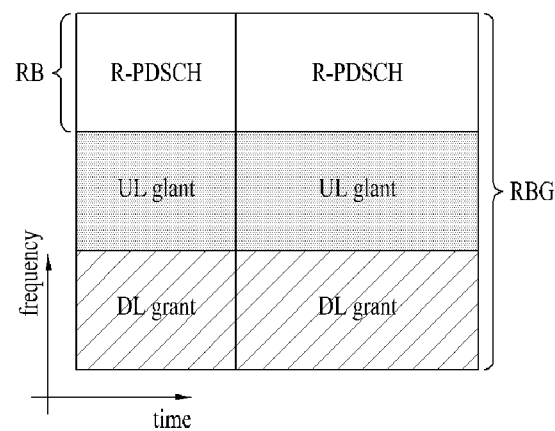

FIGS. 16 to 17 show other examples of placing and demodulating an R-PDCCH/(R-)PDCCH. In this example, it is assumed that resources for the (R-)PDSCH are allocated using Type 0 RA (RBG unit allocation) of LTE. However, this example is merely exemplary and is equally/similarly applied to even the case in which Type 1 RA (RB unit allocation) of LTE is used. Although the case in which an RBG including DL grant is allocated to a relay is shown in FIGS. 16 and 17, this is merely exemplary and the RBG including DL grant may not be allocated to the relay.

FIGS. 16 and 17 show the case in which (a) data ((R-)PDSCH) is present in the resource region 2-1/2-2 (not shown), (b) UL grant for RN #1 is present in the resource region 2-1 (FIG. 16), or (c) UL grant for RN #1 is present in a resource region 2-1/2-2 (FIG. 17), in the case in which DL grant for RN #1 is present in the resource region 1-1/1-2.

In this case, RN #1 performs blind decoding so as to distinguish among (a), (b) and (c). Data or control information of RN #1 is preferably present in the resource region 2-X.

In addition, RN #1 may distinguish among (a), (b) and (c) using RA information (e.g., RBG allocation bit) of the DL grant. For example, RN #1 may determine whether data of RN #1 or UL grant restrictively allocated to the resource region 2-1 is present in the resource region 2-1 using RA information (that is, (a) or (b))(case A). In addition, RN #1 may determine whether data of RN #1 or UL grant restrictively allocated to the resource region 2-1/2-2 is present in the resource region 2-1/2-2 using RA information (that is, (a) or (c))(case B). The base station-relay operation is set to one of case A or case B. That is, RN #1 may distinguish between (a) and (b) or (a) and (c) using RA information (e.g., RBG allocation bit). The RBG allocation bit indicating which of (a) and (b) or (a) and (c) is used is set in advance. For example, it is assumed that UL grant is restricted to the resource region 2-1 or the resource region 2-1/2-2 in advance.

In addition, in the case in which DL grant for RN #1 is present in the resource region 1-1/1-2, (a) data of RN #1 is present in the resource region 2-1/2-2 (not shown), (b) DL or UL grant for another RN is present in the resource region 2-1 (FIG. 16), or (c) DL or UL grant for another RN is present in a resource region 2-1/2-2 (FIG. 17). In this case, (a) and (b) or (a) or (b) may be distinguished using the RBG allocation bit. A determination as to which of (a) and (b) or (a) and (c) is used should be set using the RBG allocation bit in advance.

In the above-described method, assuming that that only the same DL/UL grant size as the DL grant size is present, the RBG allocation bit is used to determine whether the value present in the resource region 2-1 or 2-1/2-2 is data or control information and the size of the DL/UL grant (that is, the resource region 2-1 or 2-1/2-2) may be determined according to the size of the detected DL grant.

The above-described method is equally applied to the case in which DL grant is present in the resource regions 1-1, 1-2 and 1-3. The above-described method is equally applied to the case in which all or part of the UL grant is present in the resource regions 1-1, 2-1 and 3-1 instead of DL grant. In this case, in the above-described method, the relay first blind-decodes UL grant instead of DL grant.

Demodulation Method Using the Same DM RS Port

A method of demodulating a DL transmission signal of another resource region using a DM RS corresponding to a successful DM RS port if demodulation of grant (e.g., DL grant) for RN #1 is successful in the resource region 1-1 and, otherwise, demodulating a DL transmission signal of another resource region using a DM RS different from the DM RS used in the resource region 1-1 is proposed. For example, if demodulation of DL grant of RN #1 is successful in the resource region 1-1, a DL transmission signal (e.g., UL grant) of the resource region 1-2 may be demodulated using the DM RS corresponding to the successful DM RS port and, otherwise, the DL transmission signal (e.g., UL grant) of the resource region 1-2 may be demodulated using a DM RS different from the DM RS port used in the resource region 1-1. More specifically, if demodulation is successful in the resource region 1-1 using DM RS port 0, the DL transmission signal (e.g., UL grant) of the resource region 1-2 may be demodulated using the DM RS of the same DM RS port 0 and, otherwise, if demodulation fails, decoding may be performed using the DM RS of DM RS port 1.

Method of Filling RB Pair with UL Grant (or DL Grant) in TDM+FDM

If UL grant of RN # is present in the resource region 1-1 (that is, if DL grant of RN #1 is not present), the resource region 1-2 may not be used. In order to solve such a problem, a method of filling the resource region 1-2 with UL grant of the relay(s) including only UL grant is proposed. If a plurality of relays including only UL grant is present, it is possible to minimize resource waste by filling the resource regions X-1 and X-2 with UL grant.

Similarly, even in the case in which only DL grant is present, a method of allocating DL grant to the resource region 1-1 and the resource region 1-2 is proposed.

RS Port Allocation Method

Figure 18:
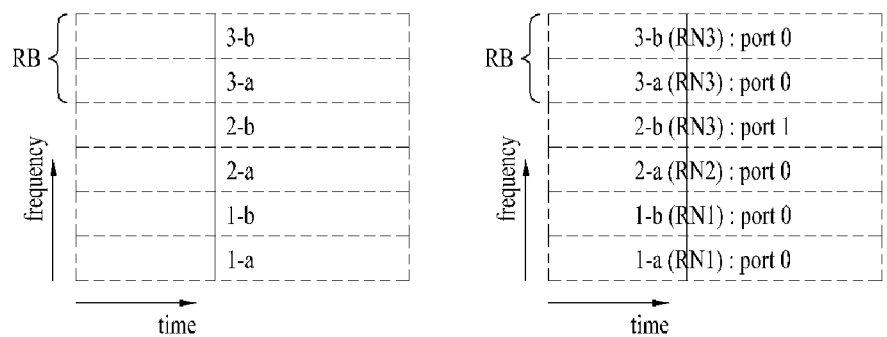
FIGS. 18 to 19 are diagrams showing examples of dividing an RB pair into a plurality of RE groups.
Figure 19:
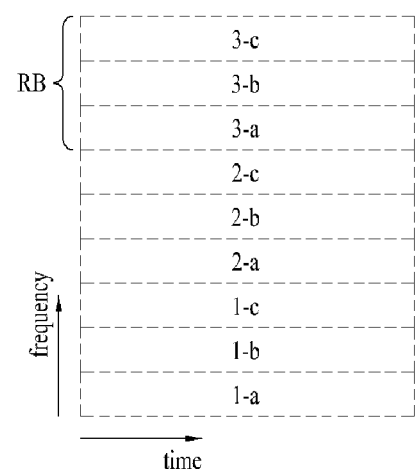

FIGS. 18 to 19 are diagrams showing examples of dividing an RB pair into a plurality of RE groups. In the examples of FIGS. 18 and 19, it is assumed that all or part of symbols of a subframe is defined in a start and end part of a resource region.

FIG. 18 shows the case of dividing one RB pair into two RE groups (X-a and X-b). In FIG. 18, the sizes of X-a and X-b (X=1, 2, 3) may be the same or different. It is assumed that the resource regions 1-a and 1-b are used to forward DL grant and UL grant of RN #1, the resource region 2-a is used to forward DL grant of RN #2, the resource regions 2-b and 3-a are used to forward DL grant of RN #3, and the resource region 3-b is used to forward UL grant of RN #3. In this case, the resource regions 1-a and 1-b are configured to perform demodulation based on one DM RS port, the resource regions 2-a and 2-b are configured to perform demodulation based on different DM RS ports, and the resource regions 3-a and 3-b are configured to perform demodulation based on the same DM RS port. By this configuration, it is possible to obtain a better performance using the same DM RS port in case of DL/UL grant forwarded to the same RN and to suitably allocate a DM RS port to each RN in case of DL/UL grant forwarded to different RNs.

FIG. 19 shows the case of dividing one RB pair into three RE groups (X-a, X-b and X-c). FIG. 19 is equal to FIG. 18 except that the number of RE groups is changed. Thus, for a description thereof, refer to FIG. 18.

R-PDCCH Mapping and Detection in Case of High Aggregation Level

Figure 20:
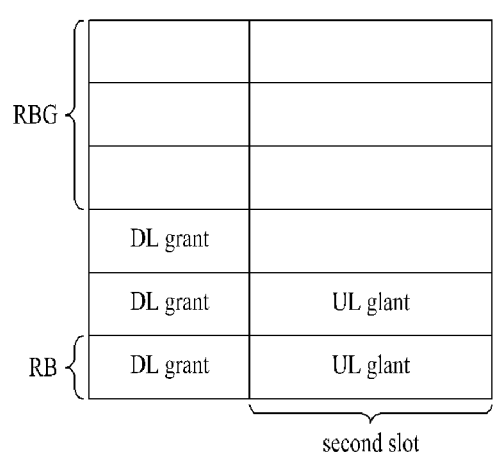

In the relay, an R-CCE aggregation level (e.g., 1, 2, 4, 8, . . . ) of an R-PDCCH may be changed according to channel environment. This is similar to a CCE set of an LTE PDCCH. The R-CCE is defined in order to represent a CCE for a relay, for convenience. In the following description, R-CCE and CCE are used interchangeably. It is assumed that DL grant of the R-PDCCH is present in three RBs as shown in FIG. 20 and UL grant is transmitted in a second slot of two RB pairs. In this case, when DL grant is blind-decoded to check R-CCE aggregation shown in FIG. 20, the relay may not be aware of whether UL grant or data is present in the second slot.

A method similar to the above-described method is applicable. That is, it is possible to indicate whether UL grant is present in the second slot using an RBG allocation bit. Preferably, it may be assumed that an RBG including DL grant is allocated to the relay. Accordingly, if DL grant is present in a first slot, a resource allocation bit of the RBG may indicate whether an R-PDSCH or UL grant is present in a second slot. The following cases are possible.
  (a) Presence of the R-PDSCH in the second slot, or
  (b) Presence of UL grant for a relay or UL grant for another relay in the second slot. UL grant of another RN may be CRC checked using an RN ID.

It is necessary to determine in which RB(s) UL grant is present. The number of RB pairs including UL grant may be changed according to R-CCE aggregation level.

The number/positions of RB pairs including UL grant may be checked by generating a simple relationship between a DL grant size and a UL grant size, which will be described with reference to FIGS. 21 to 22.

Figure 21:
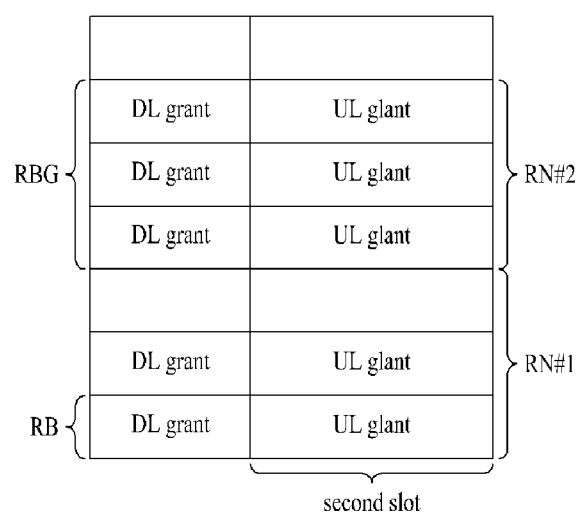

Referring to FIG. 21, UL grant may always be present in an RB pair including DL grant. Accordingly, if DL grant is present in two RB pairs, UL grant may be equally present in two RB pairs. Accordingly, if DL grant is successfully detected, the relay may check where UL grant is present. At this time, the aggregation level of UL grant may be set to be greater than the aggregation level of DL grant. Alternatively, it may be defined that a difference between the aggregation level of DL grant and the aggregation level of UL grant is N_level in advance.

In one embodiment, it may be defined that one R-CCE is present in a first slot of an RB pair and two R-CCEs are present in a second slot. In this case, the R-CCE of the first slot and the R-CCE of the second slot are different in size. According to the present example, it may be defined that the aggregation level of DL grant×2=the aggregation level of UL grant in advance. Referring to FIG. 21, the aggregation level of DL grant for RN #1 is 1 and the aggregation level of UL grant is 4. Similarly, the aggregation level of DL grant for RN #2 is 3 and the aggregation level of UL grant is 6.

As another example, it may be defined that an R-CCE size may be defined in slot units. That is, one R-CCE is present in a first slot of an RB pair and one R-CCE is present in a second slot. In this case, the R-CCE of the first slot and the R-CCE of the second slot are different in size. According to this example, it may be defined that the aggregation level of DL grant=the aggregation level of UL grant in advance. Referring to FIG. 21, in case of RN #1, the aggregation level of DL grant=the aggregation level of UL grant=2. Similarly, in case of RN #2, the aggregation level of DL grant=the aggregation level of UL grant=3.

Referring to FIG. 22, an R-CCE size is set to 1 and the aggregation level of DL grant is equal to the aggregation level of UL grant. For example, the R-CCE size may be 32 REs. In this case, since the resource region of the second slot is larger, the placement shown in FIG. 22 is obtained. In case of RN #2, only some resources of the second slot of the second RB pair are used to transmit UL grant. In this case, an empty space of the second slot may be used to transmit data (FIG. 22(a)) or may not be used to transmit data (FIG. 22(b)).

As another method, the number of RBs occupied by UL grant may be restricted. For example, as in the case of RN #1 of FIG. 22, there is a restriction that UL grant may always be transmitted in the second slot of one RB pair. Such a restriction may be fixed in the standard and may be transmitted from a BS to an RN through a higher layer signal. If such a restriction is present, the RN may easily check the position of the region occupied by UL grant by reinterpreting the above-described RA information and thus check the position of a data signal.

In the above description, the RBG allocation bit may be reinterpreted and used to distinguish between UL grant and data (R-PDSCH) because of the assumption that the RBG is used only for the RN. However, if the RBG is used as original meaning thereof, a separate signal may be generated. Such a signal may be present in the R-PDCCH. A determination as to whether a separate signal is used or the RBG is reinterpreted and used may be set in advance or may be configured through semi-static signaling.

If decoding of UL grant fails in spite of indicating that UL grant is present in the above-described methods, data (including UL grant) present in the slot may be combined with data retransmitted via HARQ. In this case, since serious error may be generated in HARQ-combined data due to UL grant, previous data which may be included in UL grant may not be used in a HARQ combining process.

Figure 23:
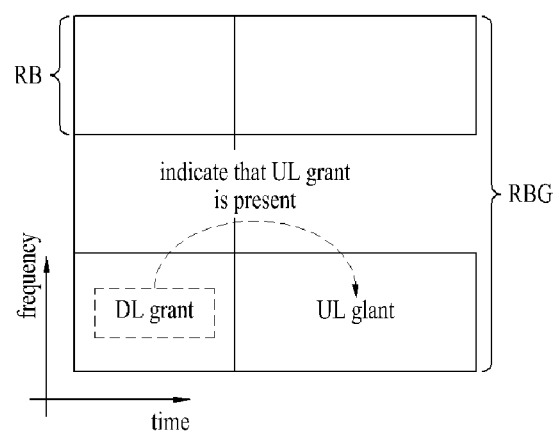

FIG. 23 shows a method of enabling DL grant to indicate presence of UL grant in a second slot by locating DL grant in a first slot even when only UL grant is present.

Referring to FIG. 23, even in the case in which there is no downlink data (e.g., (R-)PDSCH) to be transmitted from a BS to an RN (that is, UL grant only case), null DL grant (or dummy DL grant) may be transmitted in order to inform the RN that UL grant is present in the second slot of the same RB pair. According to the present example, regardless of presence/absence of downlink data for the RN, blind decoding for UL grant may be omitted and thus blind decoding complexity of the RN is reduced. In the case in which both DL grant and UL grant are transmitted but there is no downlink data for the RN as in this example, it should be indicated that there is no data corresponding to DL grant (that is, null DL grant). Therefore, null DL grant may indicate that all downlink transport blocks or codewords are disabled. In addition, null DL grant may indicate that a downlink transport block size (TBS) is TBS=0 or TBS<K (e.g., 4 RBs). In addition, null DL grant may indicate that there is no RB allocated for downlink transmission. In addition, a specific field within null DL grant may be set to "0" or "1". If null DL grant is detected, the relay interprets that data corresponding to null DL grant is not transmitted and checks presence of UL grant in the second slot from null DL grant.

Method of Indicating Use State of Second Slot (e.g., RA Bit Use)

Hereinafter, a method of indicating presence/absence of UL grant or presence/absence of an (R-)PDSCH using a bit (or similar information) of a DCI resource allocation (RA) field so as to accurately perform PDSCH data decoding will be described. For convenience, resource allocation technology used in the description is LTE technology. An RA bit indicates whether an RB or an RBG is allocated for PDSCH transmission. It is assumed that the RB or RBG is not allocated for (R-)PDSCH transmission in case of RA bit=0 and is allocated for R-PDSCH in case of RA bit=1. The meaning of the RA bit may be inversely interpreted. The meaning of the RB bit may be differently interpreted according to DL grant and UL grant.

DL grant and UL grant may be present in RBs of different slots. For example, DL grant may be present in an RB of a first slot and UL grant may be present in an RB of a second slot. In this case, a resource region for DL data and a region for UL grant coexist. Resources used to actually transmit DL data are indicated by RA of DL grant and resources used to actually transmit UL grant are checked blind decoding. Accordingly, if UL grant is detected in a resource region to which DL data is allocated, an RN receives/decodes DL data from resources other than resources in which UL grant is detected (that is, rate matching). For this reason, non-detection or misdetection of UL grant unpreferably influences on DL data decoding.

In order to solve this problem, the following restrictions are applicable to BS-RN communication.

The RN may assume that there is no UL grant in an RB or RBG in which a DL RA bit is set to 1. That is, the RN may assume that UL grant may be transmitted only in an RB or RBG in which a DL resource allocation bit is 0. In this example, some resources may be used to transmit data in an RBG in which a DL resource allocation bit is 0.

The above restriction may guarantee accurate rate matching upon DL data (that is, (R)-PDSCH) decoding even when UL grant detection fails (that is, a non-detection case) or UL grant is misdetected (that is, a false alarm case).

Accordingly, the BS does not transmit UL grant in an RB or RBG in which a DL resource allocation bit is set to 1. For example, in case of Type 0 RA, the BS does not transmit UL grant in an RBG to which DL data for the RN is allocated, except for an RBG in which DL grant and UL grant coexist.

Figure 24:
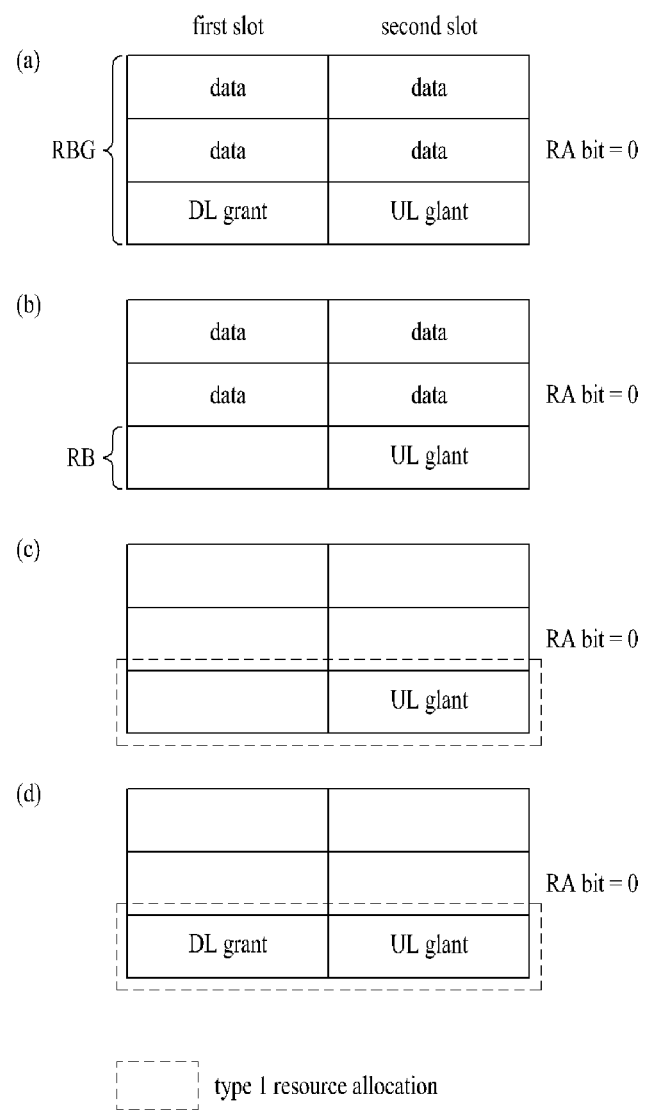
FIG. 24 is a diagram showing the case of transmitting UL grant only in the case in which a DL RA bit is set to 0.

FIG. 24 is a diagram showing the case of transmitting UL grant only in the case in which a DL RA bit is set to 0. For convenience, this example is described using Type 0 RA of LTE. RA=1 means that an RBG is allocated for DL data transmission according to normal RA interpretation. However, RA=0 may have meaning different from normal RA interpretation. In this example, it is assumed that a DL grant search space and a UL grant search space are respectively present.

Referring to FIG. 24, if DL grant is successfully detected and an RA bit is, for example, "0", UL grant may be designed to be present at an arbitrary place of an RB or RBG in which the RA bit is "0" within a UL grant search space (UL SS). Although the UL grant search space is configured regardless of the RA bit, a BS scheduler may intentionally allow UL grant to be present only in a place where an RA bit is "0". That is, RA bit=0 means an RBG in which UL grant may be transmitted and resources in which UL grant may be transmitted may be restricted to resources satisfying both UL SS and RA bit=0. In this case, RA bit=0 indicates some subsets in an R-PDCCH search space. Accordingly, the RN may restrict a UL grant search position to resources set to RA bit=0 within the UL SS if DL grant is detected. Therefore, it is possible to prevent unnecessary UL grant misdetection. In other words, an RB or RBG with RA bit=1 may be excluded from a UL grant search space.

If RA bit=1, the RN may assume that UL grant is not transmitted in the RB or the RBG. In contrast, RA bit=0, the RN may assume that UL grant may be transmitted in the RB or RBG. The BS transmits UL grant in the RB or RBG with RA bit=0. The RN may perform blind decoding when being unaware of presence/position of UL grant and decode UL grant at a specified position when being aware of the position of UL grant. According to interpretation of RA bit=0, since a UL Grant search space (UL SS) can be dynamically restricted (or allocated) using DL RA, it is possible to reduce the number of times of blind decoding for UL grant.

In the above description, RA bit=0 is interpreted as resources used to transmit UL grant. However, RA bit=0 may mean an RB or RBG in which UL grant is actually transmitted within UL SS. In this case, interpretation of RA bit=0 may be restricted to a specific RB (pair) or RBG. For example, interpretation of RA bit=0 may be restricted to an RB (pair) or RBG in which DL grant is present.

In consideration of data transmission, interpretation of RA bit=0 may further include the following cases. For example, an RBG with RA=0 may include data transmission if DL grant or an arbitrary R-PDCCH is present in the RBG ((a) to (b)). As another example, there may not be data transmission in an RBG with RA=0 regardless of presence/absence of an R-PDCCH ((c) to (d)).

In FIG. 24, a dotted line shows the case in which Type 1 RA is used. In Type 1 RA, interpretation of an RA bit is applied in RB units.

In the following description, if an aggregation level of DL and UL grant is increased, it is assumed that R-PDCCHs are sequentially and contiguously extended and allocated to neighboring VRBs (non-interleaving). In this case, R-PDCCHs are not non-contiguously allocated. Actual PRB mapping may be different. Although RA information within DL grant is described based on Type 0 of LTE in the following description, the RA information within DL grant is not limited to a specific type in the present invention.

Figure 25:
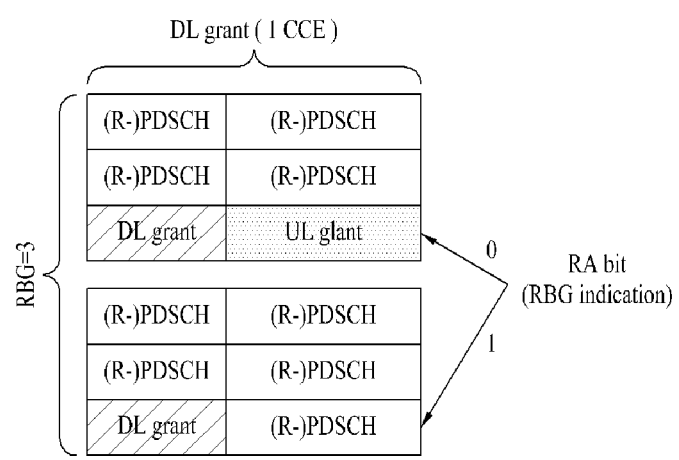
FIGS. 25 to 27D are diagrams showing a method of indicating a resource use state of a second slot.

FIG. 25 shows a method of indicating an RA state (e.g., presence/absence of UL grant) of a second slot according to the present invention. FIG. 25 shows the case of RBG=3RBs, 1 CCE DL grant and 1 CCE UL grant. For convenience, one RBG, in which DL grant is present, among three RBGs allocated by DL RA is shown. If interleaving is applied, DL grant may be present in a plurality of RBs or RBGs.

Referring to FIG. 25, if 1-CCE DL grant is transmitted, a method of indicating whether UL grant is present in a resource region of a next slot is performed by reinterpreting the existing RA bit (an RB indicator or an RBG indicator). For example, in case of RA bit=0, UL grant may be present in a next slot of an RB pair in which DL grant is present in the RBG and an R-PDSCH is allocated from a next RB pair. In contrast, in case of RA bit=1, UL grant is not present in a next slot of an RB pair in which DL grant is present in the RBG and the resource region is filled with an R-PDSCH or an R-PDSCH is not present in the resource region. Presence/absence of the R-PDSCH is set in advance as shown in FIG. 24. Interpretation of the RB bit shown in FIG. 25 may be restricted to an RB (pair) or RBG in which DL grant is present.

In LTE, DCI formats 0 and 1A are equal in size and are distinguished using a 1-bit type indication field. If DL grant and UL grant are respectively configured in independent spaces, a field for distinguishing DL/UL grant is not necessary. Accordingly, although not shown, as another example, a type indication field for distinguishing between DCI formats 0 and 1A may be used as described above. For example, a type indication field may indicate presence/absence of UL grant or presence/position/placement of UL grant (e.g., a second slot of an RB pair in which DL grant is present, 1 CCE). In this example, the type indication field may be used additionally to or independently of the existing RA bit.

Since a resource region of a second slot is greater that a resource region of a first slot within an RB pair, the number of CCEs included in an RB of each slot may be differently defined. For example, the RB of the first slot may include one CCE and the RB of the second slot may include two CCEs. In this case, UL grant may occupy only one CCE between two CCEs of the second slot. In addition, UL grant may be predetermined or signaled so as to completely fill the resource region of the second slot (2 CCEs). The CCE aggregation level of UL grant is preferably extended to 2, 4 or 6 because of simple signaling.

Figure 26A:
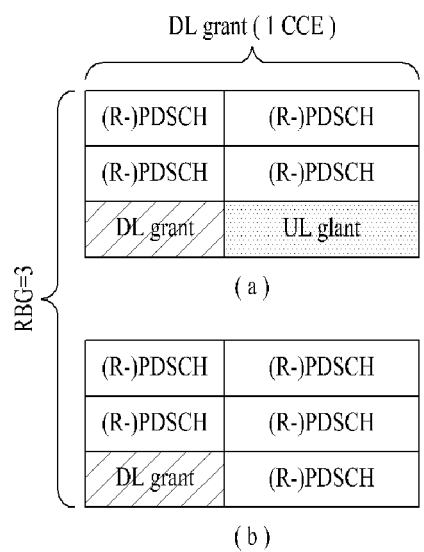
Figure 26B:
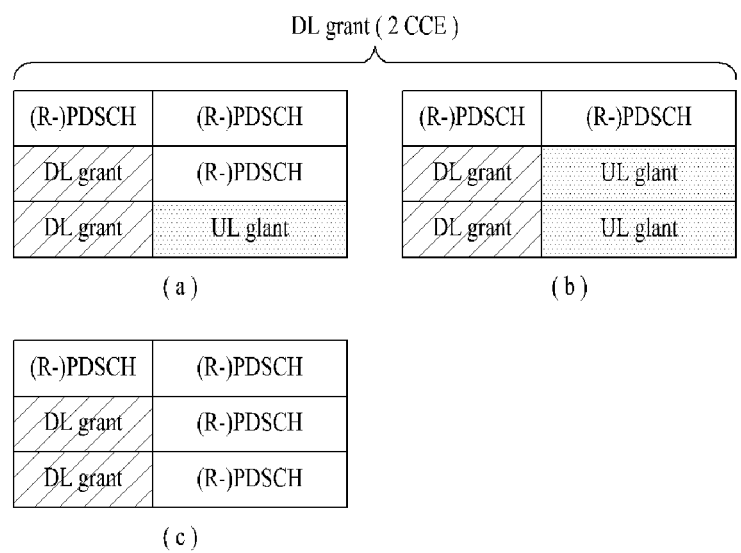

FIGS. 26A to 26C show UL grant transmission according to a DL grant CCE aggregation level. FIGS. 26A to 26C show the cases in which the DL grant CCE aggregation level is 1, 2 and 3, respectively. Although RBG=3RBs is shown, the number of REs configuring the RBG is not limited thereto. For convenience, one RBG, in which DL grant is present, among three RBGs allocated by DL RA is shown. If interleaving is applied, DL grant may be present in a plurality of RBs or RBGs.

Referring to FIG. 26A, if 1-CCE DL grant is detected by blind decoding (BD), it is important to check how UL grant is placed in a second slot/resource region of an RB pair in which DL grant is detected. If decoding of UL grant fails and this UL grant is misrecognized as data and is decoded, (R-)PDSCH decoding error may be generated. Accordingly, it is necessary to accurately detect the position of UL grant in terms of error case handling. If 1-CCE DL grant is detected in a first resource region, a method of indicating UL grant or (R-)PDSCH (including empty) in a second resource region may use an RA bit (RB indicator) for an RB or an RA bit (RBG indicator) for an RBG. Since only two cases are indicated, 1-bit information is sufficient.

Referring to FIG. 26B, if 2-CCE DL grant is detected, the number of cases of placing UL grant and R-PDSCHs in a second resource region of an RB pair is large, but may be restricted to three if the above-description assumption is applied as shown. Accordingly, instead of 1 bit, a 2-bit indication is required. All cases may be indicated by adding additional 1 bit to the 1-bit RBG indication of FIG. 26A. The additional 1 bit may be obtained from a DCI format. For example, in a DCI field, a bit left by reducing the size of a field which may be restricted in backhaul may be used. More specifically, if a field is used in backhaul, a method of slightly reducing the width of the existing RA information and using the remaining bit may be used. In an LTE-A DCI format, a bit of a field, significance of which is not present or is reduced with respect to backhaul, in an additionally defined field of an LTE-A DCI may be borrowed and used. For example, a CIF field has 3 bits, but a maximum number of carriers in LTE-A is 5 and the number of actually used carriers may be less than the maximum number of carriers. Accordingly, 1 bit or a plurality of states may be borrowed from the CIF field. In addition, a combination of RRC signaling and an RA bit may be used. More specifically, the number of cases may be partially restricted through RRC signaling and one of the remaining cases may be indicated by an RA bit. For example, a UL grant transmission case may be restricted to (a) and (c) through RRC signaling and (a) or (c) may be indicated by an RA bit. The above description is commonly applied to all subsequent figures.

Referring to FIG. 26C, if 3-CCE DL grant is detected, the number of cases of placing UL grant and R-PDSCHs in a second resource region of an RB pair is large, but may be restricted to four if the above-description assumption is applied as shown. Accordingly, as shown in FIG. 26B, all cases may be indicated by 1 bit+1 bit=2 bits. Alternatively, 3-CCE DL grant allocation may not be performed. By restricting a CCE aggregation level to $2^n$ (n=0, 1, 2, ...), it is possible to reduce DL grant BD complexity. For example, the RN may perform BD only with respect to 1-, 2- or 4-CCE DL grant.

FIGS. 27A to 27D show UL grant transmission according to a DL grant CCE aggregation level if an RBG includes four RBs. FIGS. 27A to 27D show the case in which the DL grant CCE aggregation level is 1, 2, 3 and 4, respectively. For convenience, one RBG, in which DL grant is present, among three RBGs allocated by DL RA is shown. If interleaving is applied, DL grant may be present in a plurality of RBs or RBGs. Since the basic conditions are equal to FIGS. 27A to 27C, refer to FIGS. 27A to 27C, for detailed description thereof.

Figure 27A:
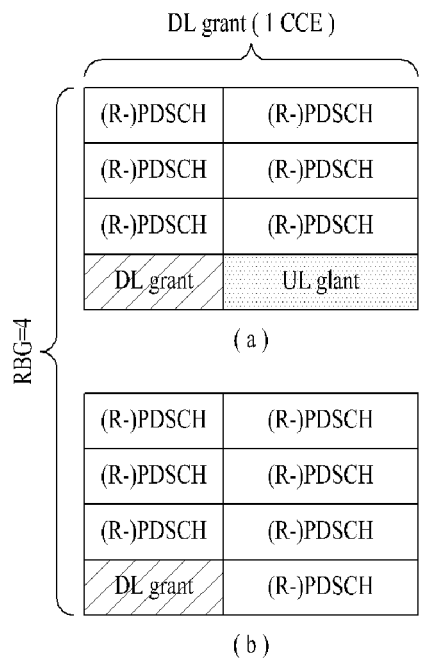
Figure 27B:
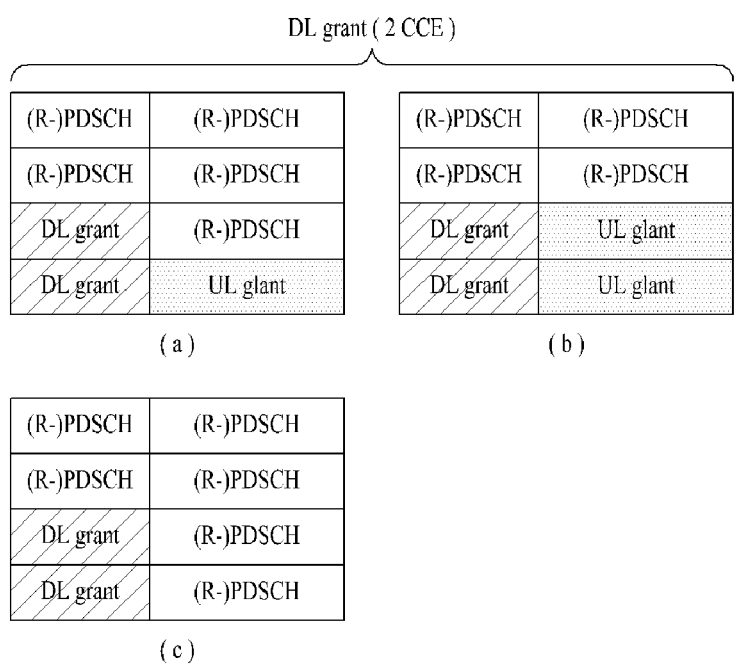

Referring to FIG. 27A, if 1-CCE DL grant is detected, two transmission cases may be applied and may be indicated by an RA bit (1 bit) of an RBG. Referring to FIG. 27B, if 2-CCE DL grant is detected, three transmission cases may be applied and indicated by 2 bits. As described with reference to FIG. 26B, three cases may be indicated by adding additional 1 bit to the RA bit (1 bit) of the RBG. For example, the additional 1 bit may be obtained from a DCI format. For example, a bit left by slightly reducing the width of the existing RA information may be used. In addition, 1 bit or a plurality of states may be borrowed from the CIF field. In addition, a combination of RRC signaling and an RA bit may be used. In this case, the number of cases may be restricted through RRC signaling and one of the remaining cases may be indicated by an RA bit.

Figure 27C:
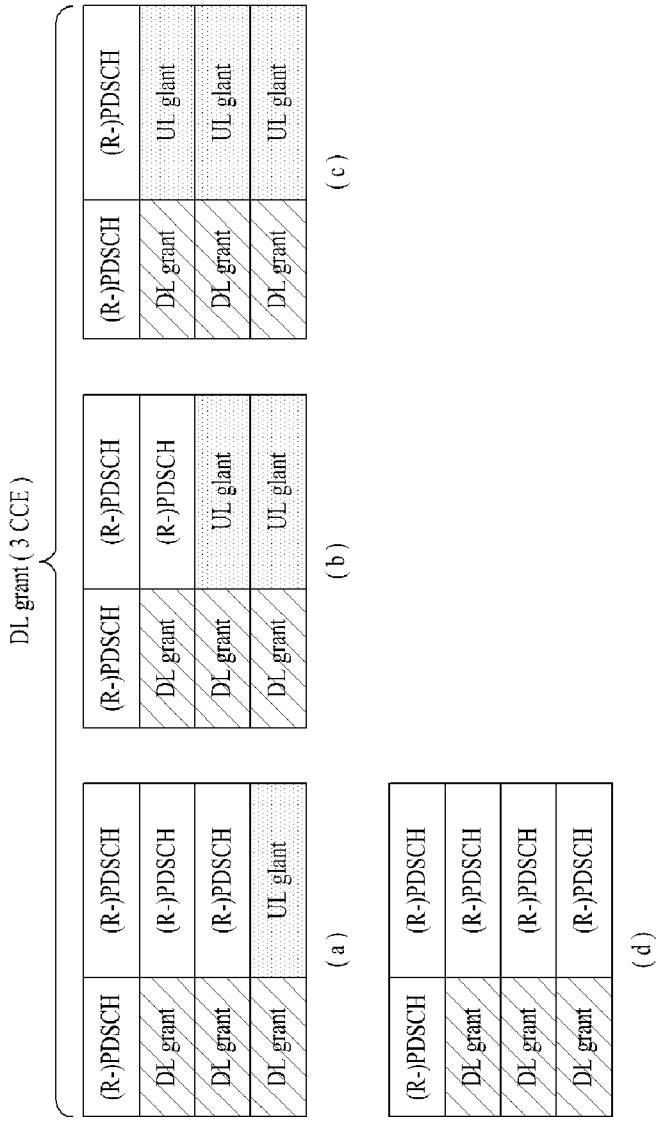
Figure 27D:
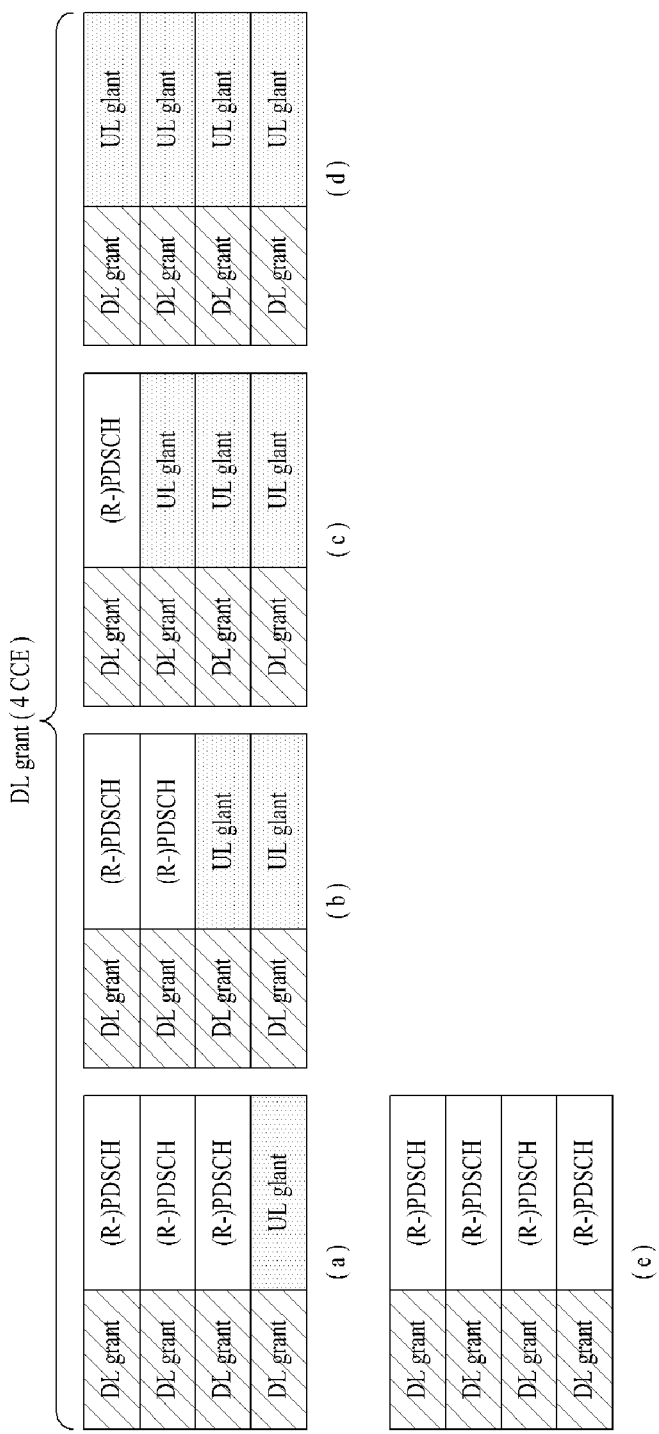

Referring to FIG. 27C, if 3-CCE DL grant is detected, four transmission cases may be applied. Accordingly, all cases may be indicated by 2 bits. Similarly to RBG=3RBs of FIG. 26C, the 3-CCE DL grant case may be excluded. Referring to FIG. 27D, if 4-CCE DL grant is detected, five transmission cases may be applied. Accordingly, all cases may not be indicated by 2 bits. However, an additional assumption may be given. For example, in FIG. 27D, 3-CCE UL grant (c) in which the CCE aggregation level is an odd number may not be used. Alternatively, in FIG. 27D, 4-CCE UL grant may not be used. Since resources of the second slot are more than resources of the first slot, the CCE aggregation level of DL grant may be set to be lower than the CCE aggregation level of UL grant. By excluding one or more cases from (a) to (d), all cases may be indicated by 2 bits.

In the above-described case, all cases may be indicated by 2 bits by restricting the UL grant aggregation level. For example, the UL grant aggregation level may be restricted to 1 and 2 or 1, 2 and 4. In particular, since a second resource region in which UL grant is located is large, it is assumed that only 1 RB (e.g., 1-CCE) or 2 RBs (2-CCE) is used. Since the CCE of the second slot includes REs which correspond to about twice those of the CCE of the first slot, even when the UL grant aggregation level is restricted to 1 or 2, UL grant may substantially have a code rate corresponding to DL grant of an aggregation level of 2 or 4. If a boundary between the first resource region and the second resource region is adjusted such that the resource regions are identical, a method of setting the UL grant aggregation level to 1, 2 and 4 is advantageous. In this case, the DL grant aggregation is preferably restricted to 1, 2 and 4.

CCEs having the same size may be defined or several CCE having a restricted size may be defined. The above-described CCE conceptually represents a unit for allocating DL/UL grant as shown in each figure.

In the above description, an example of providing information about a use state (e.g., presence/placement of UL grant) of a second slot was described by differently interpreting the RA bit. However, instead of differently interpreting the RA bit, a new bit field may be added to DCI in order to provide information about the use state of the second slot. The new bit field may be part (e.g., 2 bits) of a bit field previously defined for another purpose or a dedicated bit field newly defined for this purpose.

FIG. 28 shows an example of using a field of a DCI format in order to provide information about a use state (e.g., presence/placement of UL grant) of a second slot. The method of FIG. 28 may be used along with or separately from interpretation of the RA bit.

Referring to FIG. 28, DCI format 0/1A includes a 1-bit flag field (0/1A) for distinguishing the DCI format 0/1A. DCI format 0 is for UL grant and DCI format 1A is for DL grant. As shown in the above figures, if resources used to transmit DL grant and UL grant are divided in a time domain or a UL grant size is different from a DL grant size, the flag field for distinguishing the DCI format 0/1A is not necessary. Accordingly, the flag field for distinguishing the DCI format 0/1A may be used to provide information about the use state (e.g., presence/placement of UL grant) of the second slot. In addition, DCI format 1A/1B/1C includes an L/DVRB indication field (L/DVRB). In case of an RN, if DVRB is always disabled (OFF) and only LVRB is supported, the L/DVRB indication field may be used to provide information about the use state (e.g., presence/placement of UL grant) of the second slot. DCI format 1/2/2A/2B includes a resource allocation header field RA Hdr indicating RA type 0/1. If the RA type is semi-statically signaled by a higher layer (e.g., RRC), a field indicating the RA type may be used to provide information about the use state (e.g., presence/placement of UL grant) of the second slot.

RRC Signal+RBG Indication

Next, a method of using an RRC signal in order to provide information about the use state (e.g., presence/placement of UL grant) of the second slot will be described in detail. A method of maintaining each field of the existing DCI format and indicating information associated with a DL grant aggregation level or a UL grant aggregation level through RRC may be used. In particular, information associated with the DL/UL grant aggregation level may be transmitted on a RN-specific basis. Since each RN has unique channel quality and a channel is not rapidly changed due to the nature of backhaul, at least the aggregation level may be signaled through RRC. Information associated with the aggregation level may mean a DL/UL grant aggregation level (e.g., 1 CCE, 2 CCEs, etc.) or even a resource region (or resource placement) occupied by DL/UL grant. The existing RA bit (e.g., an RBG indication bit) may be reinterpreted and used. By using the RRC signal and reinterpretation of the RA bit, a specific bit does not need to be borrowed from the existing DCI format. For example, a CCE aggregation level may be indicated by the RRC signal and presence/absence of UL grant, presence/absence of data, etc. may be indicated by a DL RA bit in a second slot. This has an advantage that presence/absence of UL grant or (R-)PDSCH is dynamically indicated on a subframe basis.

Figure 29:
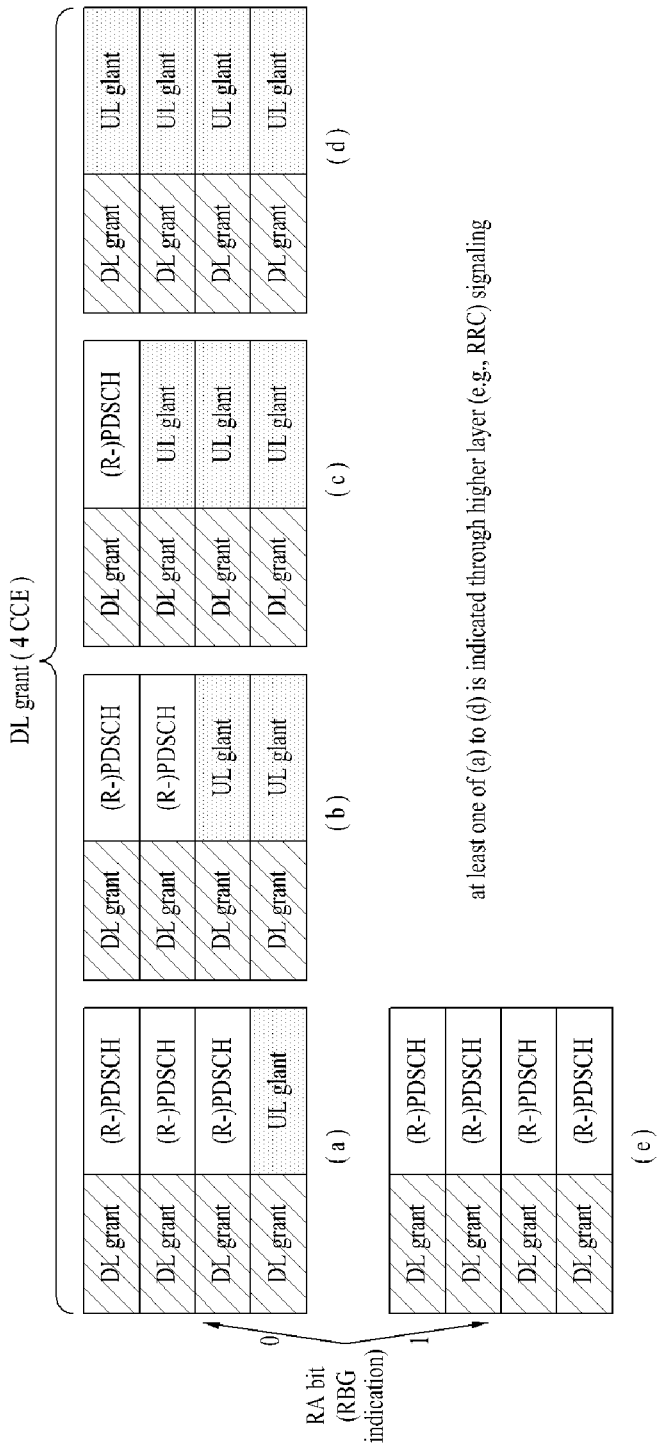
FIGS. 29 to 42 are diagrams showing various methods of indicating a resource use state of a second slot.

FIG. 29 shows an example of indicating placement of UL grant by an RRC signal. FIG. 29 shows the case of RBG=4RBs and 4-CCE DL grant. Although FIG. 29 shows a total of five UL grant placement combinations, there may be more various combinations. If the number of UL grant placement combinations is restricted to 5, 5 pieces of placement information may be signaled to each RN through RRC. The RA bit (that is, RBG indication bit) may be used to check presence/absence of UL grant in the RBG. For example, if one of (a) to (d) is indicated through RRC signaling, the RN may interpret the use state of the second slot as (a) or (e) by the RA bit. If the size of the RRC signaling bit is not problematic, placement of all cases may be signaled. Thus, optimized resource allocation is possible. In this case, if the relay may attempt to perform blind decoding with respect to (a) to (d) in the RBG if the RA bit is 0. As another method, along with or separately from interpretation of the RA bit, placement of actually transmitted UL grant may be indicated using the DCI field (or bit) (e.g., a type indication bit) described with reference to FIG. 28.

Figure 30:
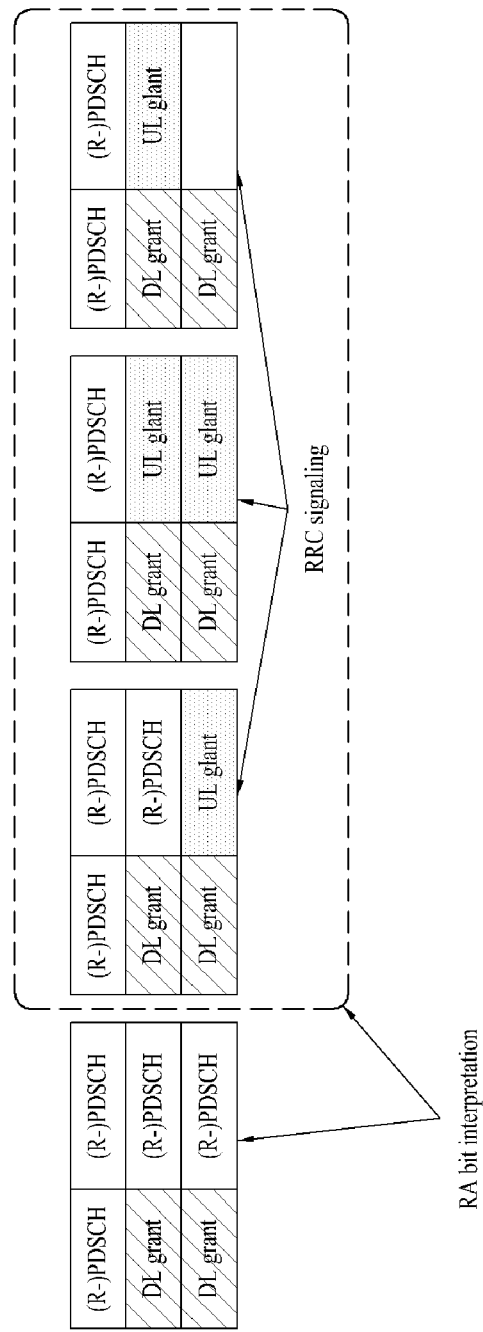

FIG. 30 shows all cases in which UL grant may be placed in case of RBG=3RBs and 2-CCE DL grant. Similarly to FIG. 29, a UL grant position is restricted using an RRC signal and presence/absence of UL grant may be checked using an RBG indication bit.

Figure 31:
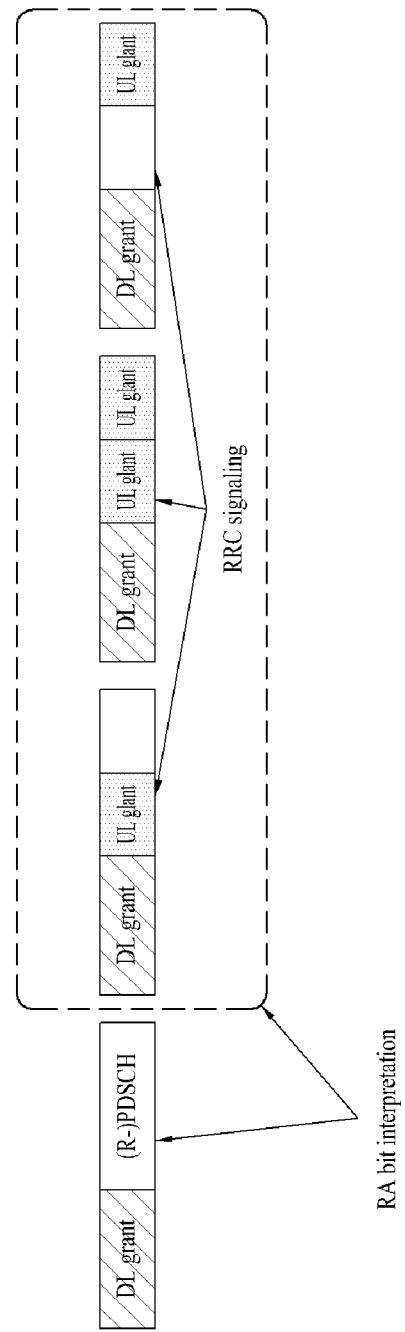

FIG. 31 shows all cases in which UL grant may be placed in case of RBG=1RB and 1-CCE DL grant. Unlike FIGS. 29 to 30, FIG. 31 shows the case in which a UL grant allocation unit is decreased. FIGS. 29 to 30 show the case in which one CCE is present in the RB of the second slot, and FIG. 31 shows the case in which two CCEs are present in the RB of the second slot. Even in this case, similarly to FIG. 29, a UL grant position is restricted using an RRC signal and presence/absence of UL grant may be checked using an RBG indication bit.

Although an RRC signal is an RN-specific signal in the above description, the RRC signal may be defined as an RN-common signal. This is possible if an RN-common channel is present. In addition, the RN-common signal is preferable if the channel properties of all RN-BS links are substantially similar.

RA Bit Interpretation

Figure 32:
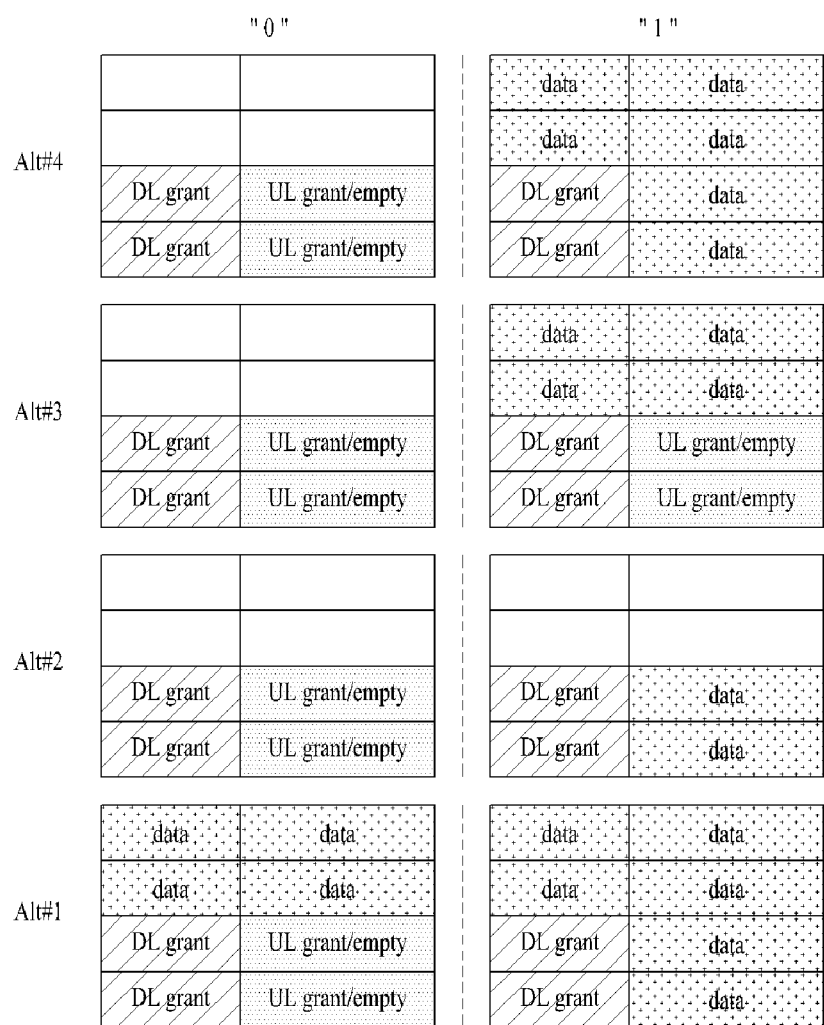

FIG. 32 shows more various methods of RA bit interpretation. Referring to FIG. 32, the following four methods may be considered with respect to RA bit interpretation (Alt #1 to Alt #4).

Method #1 (Alt #1)

An RB pair which does not include DL grant (or a frequency domain) in an RBG in which DL grant is detected is always used for data (e.g., (R-)PDSCH) transmission of an RN which is a destination of DL grant.

An RA bit of an RBG indicates usage of a second slot in an RB pair including DL grant. As shown in FIG. 32, UL grant may be transmitted in the resource region (UL grant/empty) if the RA bit is 0 and data may be transmitted in the resource region if the RA bit is 1. The RA bit may be inversely interpreted. In some cases, it may be assembled that UL grant may always be transmitted in the second slot of the RB pair including DL grant if the RA bit is 0.

Method #2 (Alt #2)

An RB pair which does not include DL grant (or a frequency domain) in an RBG in which DL grant is detected is not always used for data (e.g., R-PDSCH) transmission of an RN which is a destination of DL grant.

An RA bit of an RBG indicates usage of a second slot in an RB pair including DL grant. As shown in FIG. 32, UL grant may be transmitted in the resource region (UL grant/empty) if the RA bit is 0 and data may be transmitted in the resource region if the RA bit is 1. The RA bit may be inversely interpreted.

Method #3 (Alt #3)

Resources of a second slot in an RB pair including DL grant in an RBG in which DL grant is detected are not always used for data transmission of an RN which is a destination of DL grant.

An RA bit of an RBG indicates usage of a second slot in an RB pair (or the frequency domain) which does not include DL grant. As shown in FIG. 32, data is not transmitted in the resource region if the RA bit is 0 and data is transmitted if the RA bit is 1. The RA bit may be inversely interpreted.

Method #4 (Alt #4)

An RA bit of an RBG indicates usage of the resource region except for DL grant in the RBG in which DL grant is detected.

As shown in FIG. 32, data is not transmitted in the resource region if the RA bit is 0. In this case, a second slot of an RB pair in which DL grant is present may be used to transmit UL grant. If the RA bit is 1, data is transmitted in the whole resource region except for DL grant within the RBG. The RA bit may be inversely interpreted.

The method of FIG. 32 may be independently used and may be set by a higher layer (e.g., RRC) signal or a physical layer signal. In addition, fallback may be performed using a specific method according to a frequency domain occupied by DL grant. For example, if the number of RB pairs occupied by DL grant is equal to or greater than a predetermined value (e.g., 3), an operation may be performed using one previously selected from between method #1 and method #2 (that is, fallback mode). In addition, a method may be selected and used according to a transmission mode, whether or not interleaving is performed (that is, an interleaving mode or a non-interleaving mode), an R-PDCCH RS type (e.g., a DM RS or a CRS). In this case, a basic method is set as in a fallback operation and a specific method may be automatically applied according to configuration mode.

In Methods #1 to #4 of FIG. 32, a signal for distinguishing between 0 and 1 may be an RA bit. As another example, in methods #1 to #4, a signal for distinguishing between 0 and 1 may be some bits (e.g., see the description of FIG. 28) within the DCI. As another example, in methods #1 to #4, a signal for distinguishing between 0 and 1 may be an RRC bit. As another example, in methods #1 to #4, a signal for distinguishing each state may be an indicator of a new format composed of an RA bit and an RRC bit. For example, four states may be indicated by combining 1 RA bit+1 RRC signal bit. In this case, an additional state may be defined with respect to each method. In addition, in methods #1 to #4, a signal for distinguishing each state may be a 2-bit signal composed of an RA bit+ an additional bit (e.g., a type indication bit, etc.).

In FIG. 32, the position of UL grant means UL grant or an empty state. If UL grant decoding fails, a corresponding region is not used for data transmission, UL grant transmission is not different from the empty state upon (R-)PDSCH decoding, from the viewpoint of the RN. However, from the viewpoint of the BS, there is a difference between transmission of UL grant and non-transmission of UL grant. Accordingly, denotation of the figure may be changed according to viewpoint.

In FIG. 32, it is assumed that the size of DL grant (an aggregation level or a resource region) and the size of UL grant are identical. FIG. 32 is merely exemplary and the same method is applied to the case in which the DL grant aggregation level and the UL grant aggregation level are different. In this case, there are more cases with respect to each method and thus a signal of 2 bits or more may be necessary.

RA Bit Interpretation Considering Asymmetric or Symmetric Subframe Allocation

Figure 33:
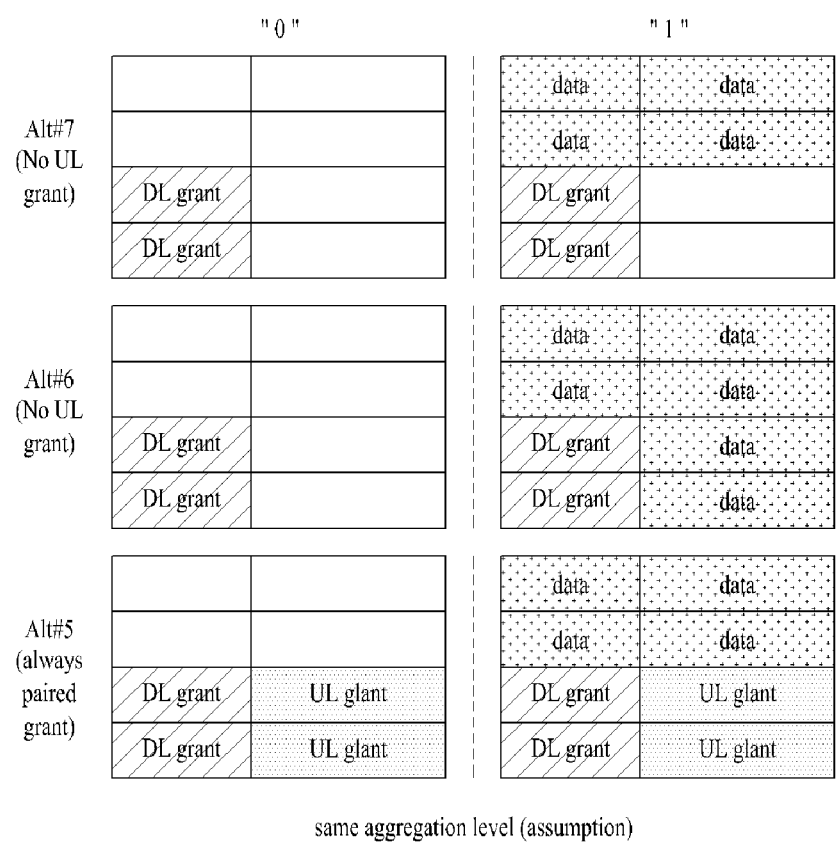
Figure 34:
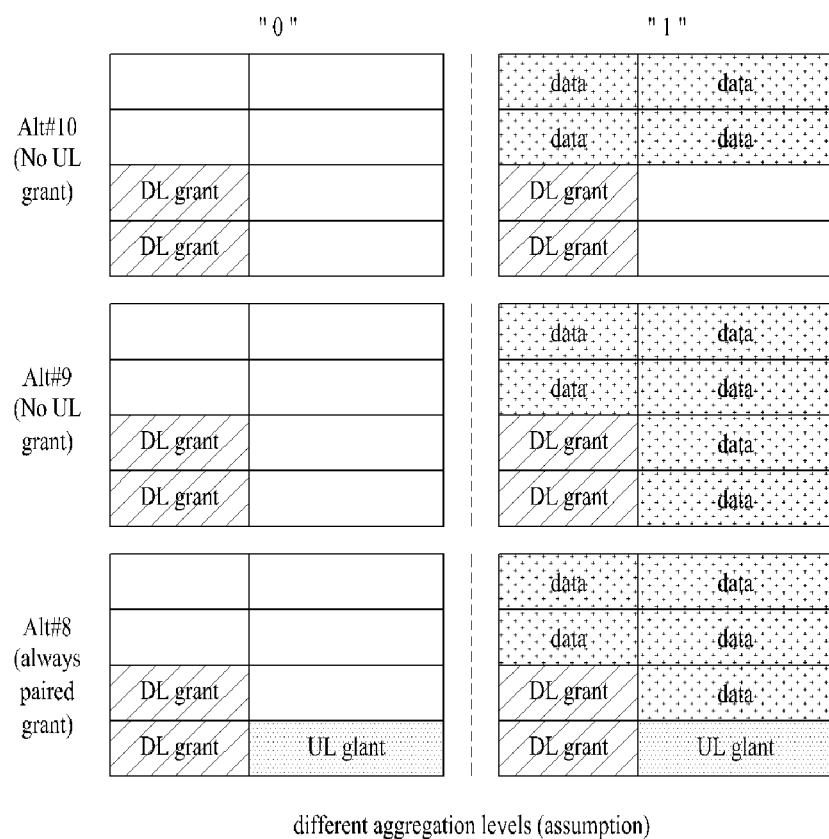

FIGS. 33 to 34 show the case in which a pair of DL grant and UL grant is always present and the case in which DL grant and UL grant are separately present. Referring to FIGS. 33 to 34, the following six methods may be considered with respect to RA bit interpretation (Alt #5 to Alt #10). An RA bit (or another bit or a new bit) may be used to indicate the position/placement of DL/UL grant and data.

In Method #5 (Alt #5), it is assumed that DL grant is detected in two RB pairs (e.g., aggregation level=2) and UL grant is transmitted in a second slot (e.g., aggregation level=2) of two RB pairs. In this case, an indication bit (e.g., an RA bit) of 0 means that data is not present in the remaining resource region of the RBG and an indication bit (e.g., an RA bit) of 1 means that data is present in the remaining resource region of the RBG.

Method #6 (Alt #6) and Method #7 (Alt #7) may be applied to the case in which only DL grant is present, that is, the case in which UL grant is not present. Method #6 means that up to a second slot of an RB pair in which DL grant is present is filled with data if an indication bit (e.g., an RA bit) is 1. In contrast, Method #7 (Alt #7) indicates that data is not present in a second slot of an RB pair in which DL grant is present if an indication bit (e.g., an RA bit) is 1 and data is present only in the remaining RB pair in which DL grant is not present. In Method #6/#7, if an indication bit (e.g., an RA bit) is 0, it means that data is not present in resources except for resources in which DL grant is present within the RBG.

Method #8 (Alt #8), Method #9(Alt #9) and Method #10 (Alt #10) of FIG. 34 show the case in which the aggregation levels or the resource regions of DL grant and UL grant are not identical. Although the DL and UL grant aggregation levels are identical due to a single CCE size, DL grant may be placed in two RBs and UL grant may be placed in one RB. In this case, this example means RB mapping rather than aggregation level.

The above-described RA interpretation method may be differently applied according to backhaul subframe allocation. For example, if a pair of a DL subframe and an UL subframe is allocated to backhaul (that is, UL grant for UL backhaul is transmitted in a DL backhaul subframe), RA interpretation is applicable on the assumption that UL grant is always transmitted, as in method #5 or #8. In contrast, in a DL subframe which does not accompany a UL subframe in which UL grant will be transmitted on a HARQ timeline (which may be referred to as a DL standalone subframe), RA interpretation may be applied on the assumption that UL grant is not present as in Methods #6, #7, #9 and #10. That is, according to the present method, the signal 0/1 may be interpreted in the subframe in which DL grant and UL grant are present and the DL standalone subframe. For example, even when there is no separate signal, the RN may automatically apply interpretation of Methods #5 and #8 in a normal subframe and interpretation of Methods #6, #7, #9 and #10 in the DL standalone subframe.

RA Interpretation Considering Various Aggregation Levels

Figure 35:
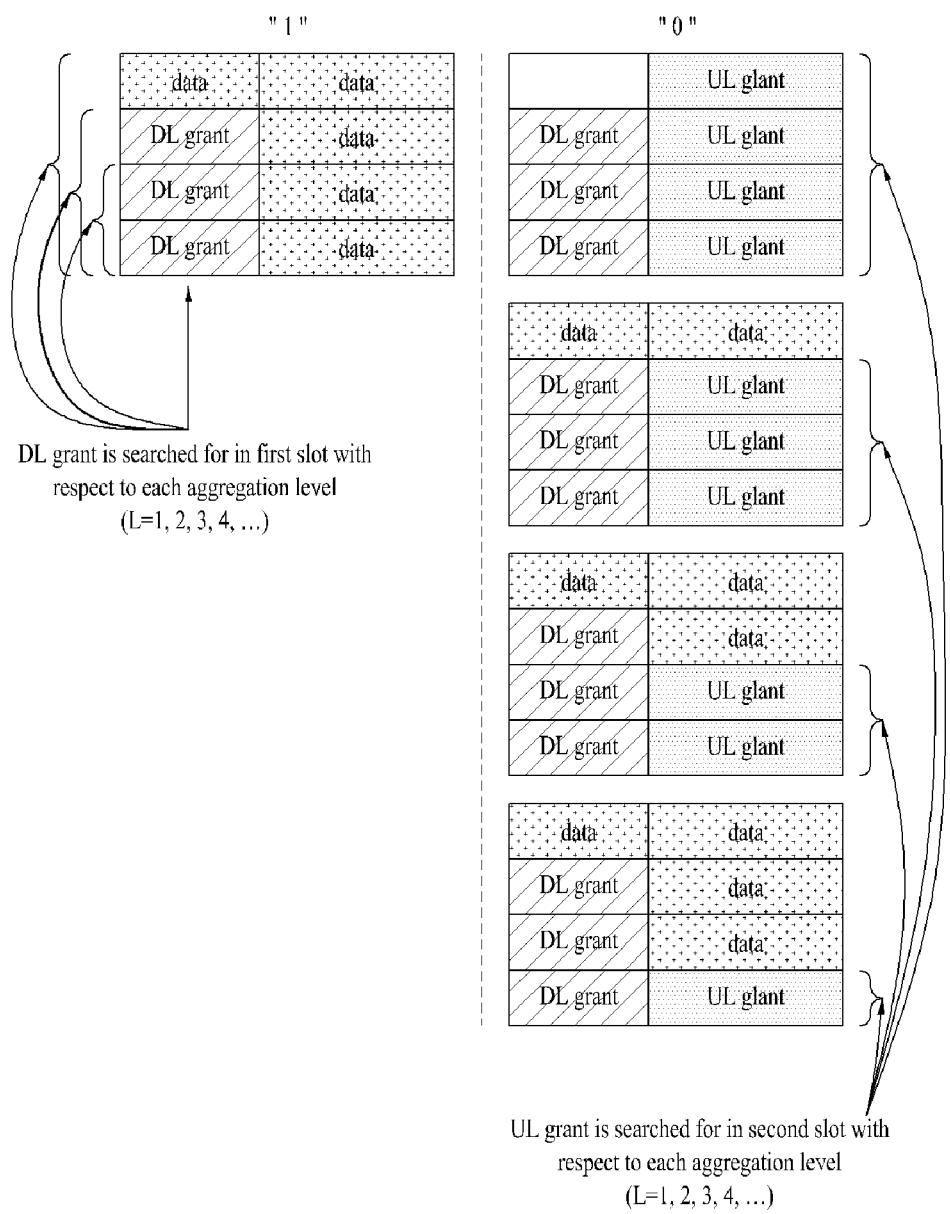

FIG. 35 illustrates the role of an RA bit in a blind decoding process if the aggregation levels of DL grant and UL grant are changed.

Referring to FIG. 35, if the RA bit is 1, it indicates that the RBG is composed of only DL grant and (R-)PDSCH data. That is, a place except for an RB in which DL grant is detected through blind decoding is filled with data to be transmitted. If the RA bit is 0, it indicates that UL grant is necessarily present. The aggregation level of UL grant may be checked through blind decoding. That is, if blind decoding of DL grant is successful, RA bit=0 or RA bit=1 is applied to the region except for the RB. In case of RA bit=0, the RN may check the region occupied by UL grant through blind decoding. Accordingly, if only one RB is occupied by UL grant through blind decoding, the remaining region is filled with data to be transmitted. Similarly, if UL grant extends over a plurality of RBs, the region except for the RBs, in which UL grant is present, obtained through blind decoding is used as data. However, if the number of RBs over which DL grant extends is greater than the number of RBs over which UL grant extends, the region except for the region in which DL grant is transmitted in a first region may be empty. That is, when only UL grant is transmitted in a second slot within an RB pair, a first slot of the RB pair may be always empty. That is, resources of a first slot within the RB pair in which UL grant is transmitted may be used only for DL grant and may not used for data.

Even when the RA bit is 0, blind decoding of UL grant in the second slot may fail. In this case, the RN should decode data in a state of being unaware of up to which region UL grant is present and thus data decoding may fail. Since blind decoding failure of UL grant does not frequently occur, data decoding may be abandoned. That is, if UL grant decoding fails, data may be discarded.

Figure 36:
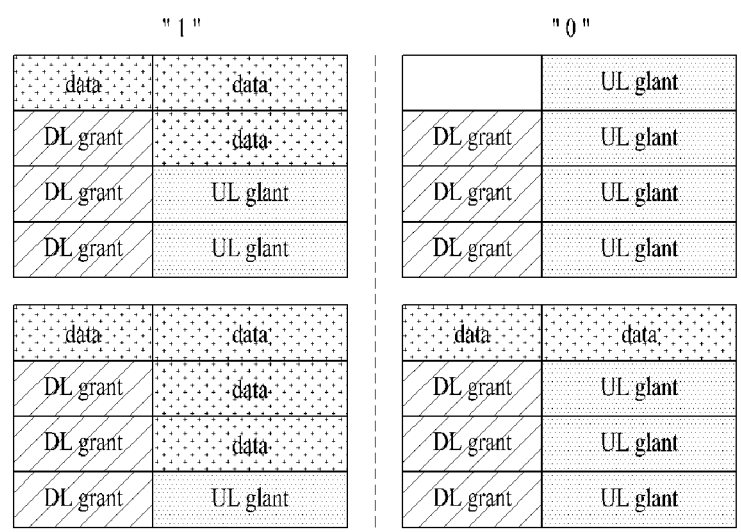

FIG. 36 illustrates the role of an RA bit in a blind decoding process in the case in which it is assumed that DL grant and UL grant are always transmitted.

Referring to FIG. 36, the case in which the RA bit is 1 does not occur in FIG. 35. Although UL grant is present, since it is impossible to guarantee that the UL and DL grant aggregation levels are identical, the four cases in which the RA bit is 0 in FIG. 35 are valid. Accordingly, in the present example, the RA bit may be used to divide the cases in which the RA bit is 0 into two groups in FIG. 35. For example, the case in which the RB occupied by UL grant is equal to or greater than the RB occupied by DL grant is indicated by RA bit=0 and the opposite case thereof is indicated by RA bit=1. In case of RA bit=1, a combination of DL grant and data may always be present in at least one RB pair. A determination as to over how many RBs UL grant extend (that is, an aggregation level) may be made by blind decoding. Accordingly, if blind decoding of UL grant fails, a method of discarding data of RBG may be used. If an additional bit (e.g., a type indication bit) is used, all four cases may be distinguished (RA bit+ type bit=2 bits). Accordingly, it is possible to detect UL grant without blind decoding. Meanwhile, if there is a restriction in placement of DL grant and UL grant, a 1 bit may be signaled without an additional bit. For example, two cases among the cases shown in FIG. 36 may be excluded by restricting a size ratio of DL grant and UL grant or restricting an aggregation level.

Signaling Indicating One of Resource Use Methods

Figure 37:
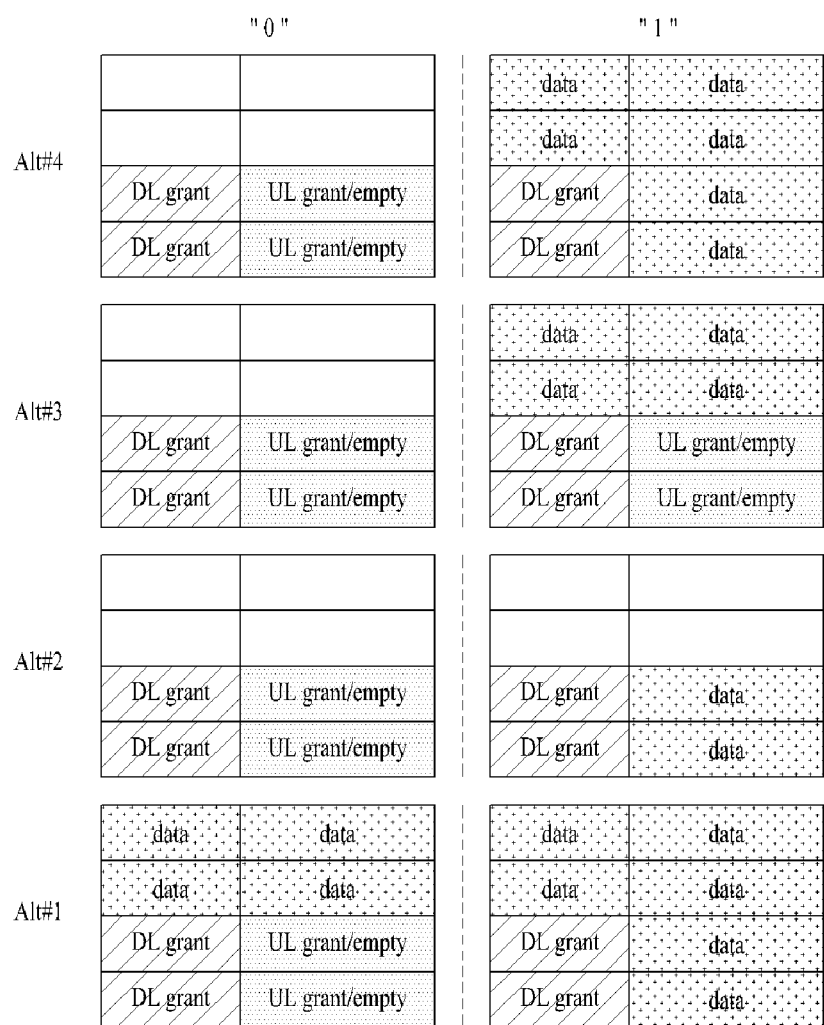

FIG. 37 shows an example of a resource use method of a second slot. For convenience, FIG. 37 shows Method #1 to Method #4 shown in FIG. 32. Accordingly, for Method #1 to Method #4, refer to FIG. 32.

Method #1 (Alt #1) will be briefly described with reference to FIG. 37. In Method #1, if DL grant is present, data thereof is always present. Here, it is assumed that the size of UL grant is decided according to the size of DL grant. For example, it may be assumed that the size of UL grant is equal to or less than the size of DL grant, in terms of the size of the actual resource region or the CCE aggregation level. Method #1 is preferable in terms of resource use and UL grant decoding error case handling. However, in some cases, Method #4 or Method #3 may be advantageous when taking RS format and interleaving into consideration. Accordingly, a method of selecting and using each method according to circumstances is proposed. For example, both Method #1 and Method #4 may be used and signaling (e.g., RRC) for distinguishing between both methods may be used. If DL grant is transmitted in several RBGs, there is an assumption/restriction that an assumption that RBs in which DL grant is not included in one RBG are used as data is equally applied to all RBGs. Otherwise, whenever the RBG is increased by one, additional signaling information of 1 bit is required. The restriction in the number of bits is not problematic in case of RRC signaling.

As another example, Methods #1, #3 and #4 may be configured, respectively. Method #3 may be used if interleaving is applied. In case of interleaving, a resource region is not used to transmit data regardless of whether or not part of UL grant is present in the second slot. Accordingly, if interleaving is applied, Method #3 is preferably used. In addition, a method of automatically determining a method according to a transmission mode may be used. In addition, each method may be selected and used depending on whether interleaving is applied (that is, an interleaving mode or a non-interleaving mode) or an R-PDCCH RS type (e.g., a DM RS or a CRS). In this case, a basic method is set as in a fallback operation and a specific method may be automatically applied according to configuration mode.

Association Between DL/UL Grant DCI Formats

DL/UL grant DCI formats which may be transmitted together via one RB pair may be restricted in consideration association therebetween. Association may be set according to various criteria, for example, using a DCI format size. For example, if DCI format 1 is used in DL grant, DCI format 0 is used in UL grant and, if DCI formats 2 and 2x are used in DL grant, DCI format 3 (new UL MIMO format) may be used in UL grant. Therefore, it is possible to substantially equally maintain the size of DL grant and the size of UL grant. In particular, since the resource region of the second slot in which UL grant is present is large, the size of UL grant does not exceed the size of DL grant.

Error Case Handling

Figure 38:
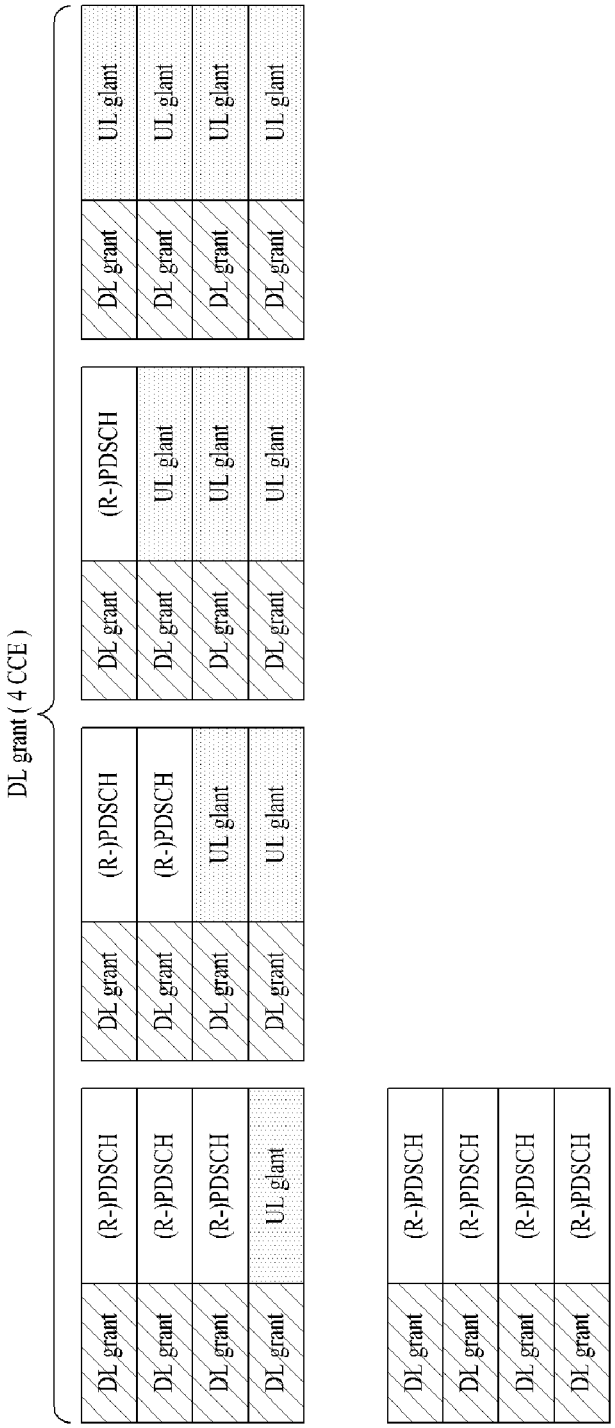

FIG. 38 shows an error case handling method in FIG. 29. Referring to FIG. 38, presence/absence of data is indicated using 1 RA bit and blind decoding is performed with respect to UL grant. In this case, in order to accurately indicate the size of UL grant, an additional bit (L1/L2, RRC signaling) may be used.

Figure 39:
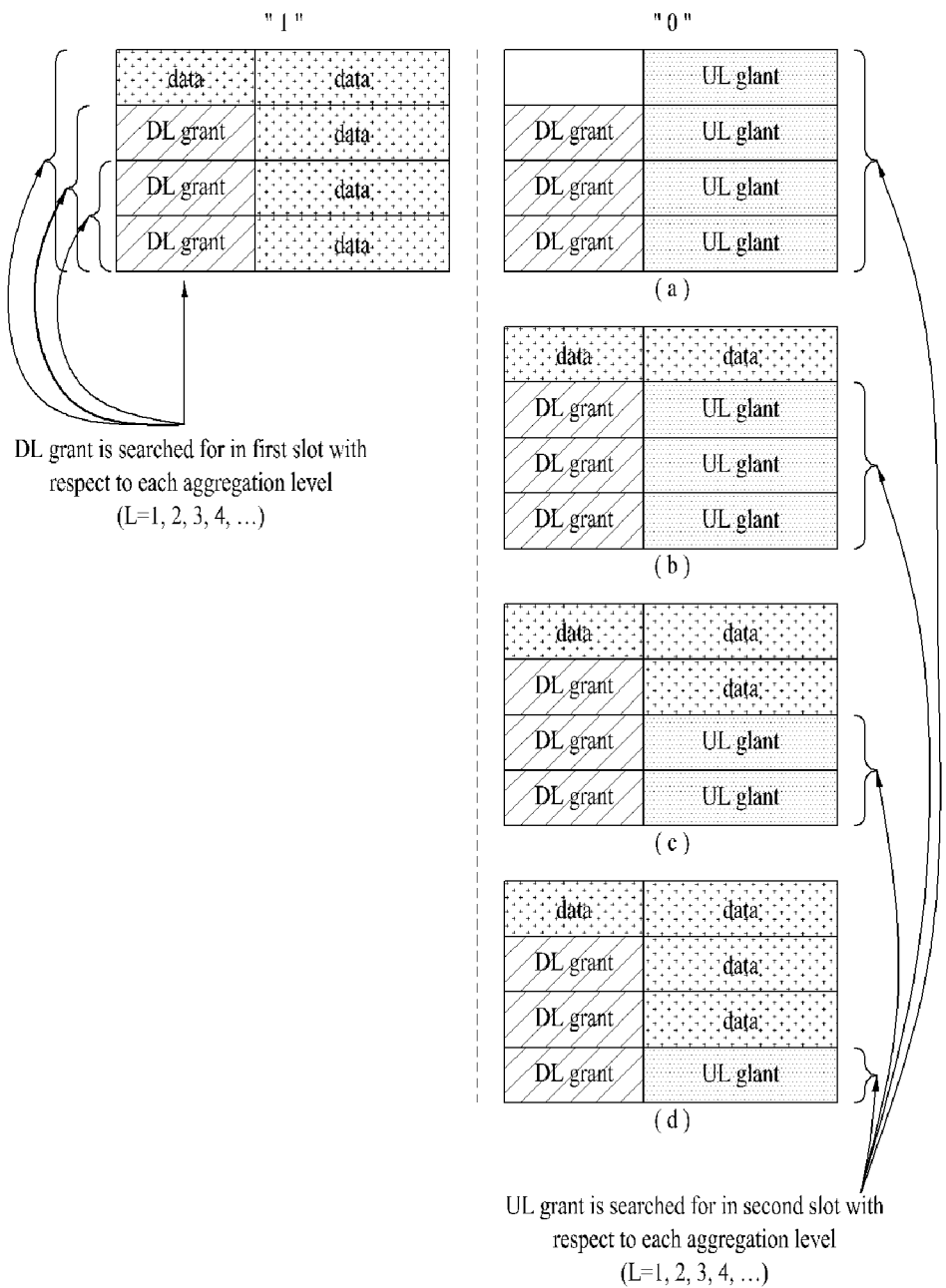
Figure 40:
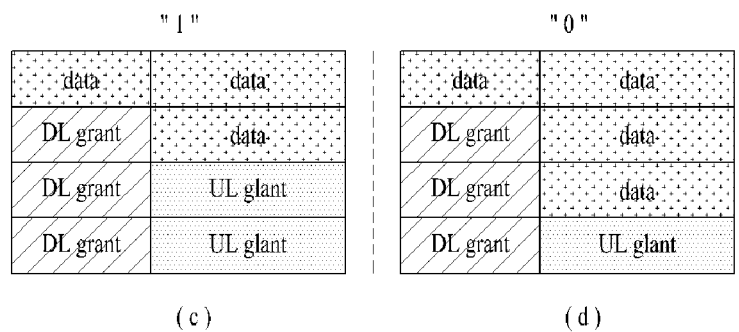

FIGS. 39 to 40 show error case handling methods with reference to FIG. 35.

Referring to FIG. 39, if a DL grant size is M, the number of cases for placing UL grant may be restricted by setting a UL grant size N to be less than M. For example, if a UL grant size is set to 2 (=N) or less (that is, 1 or 2) when a DL grant size is 3 (=M), it is possible to reduce blind decoding complexity. More specifically, as shown, assuming that an aggregation level of UL grant is 2 CCEs or less when an aggregation level of DL grant is 3 CCEs, the number of cases is decreased using (c) or (d) among (a) to (d) when a signaling or RB bit is 0. Thus, it is possible to reduce blind decoding complexity.

FIG. 40 shows the case where a transmitter and a receiver promise to exclude the case in which a signaling bit (e.g., an RA bit) is 1 (left figure) in FIG. 39 in addition to restriction of the UL grant size described with reference to FIG. 39. In this case, since a relay distinguishes between only two cases (that is, (c) and (d)), a 1-bit indication is possible. In other words, it is assumed that, when a DL grant size is M, a UL grant size N should be less than M and the number of cases for placing UL grant is restricted to two. For example, if a UL grant size is less than 2 (=N) when a DL grant size is 3 (=M) (that is, 1 or 2), a 1-bit indication is possible.

Support of "DL Grant Only Case" and "DL Grant+ UL Grant Case"

Figure 41:
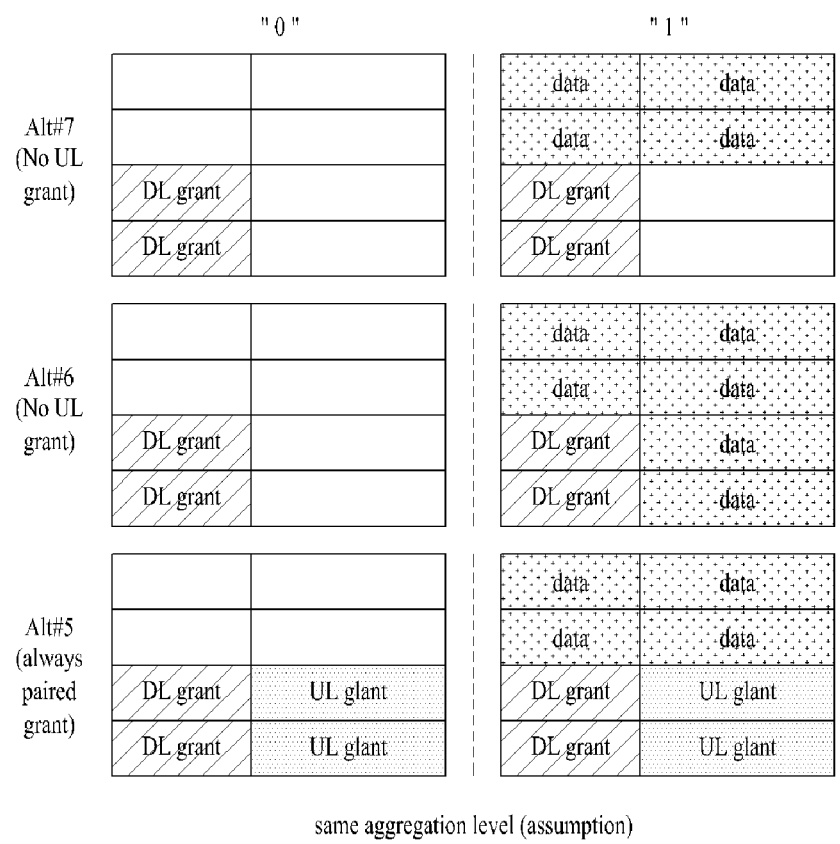
Figure 42:
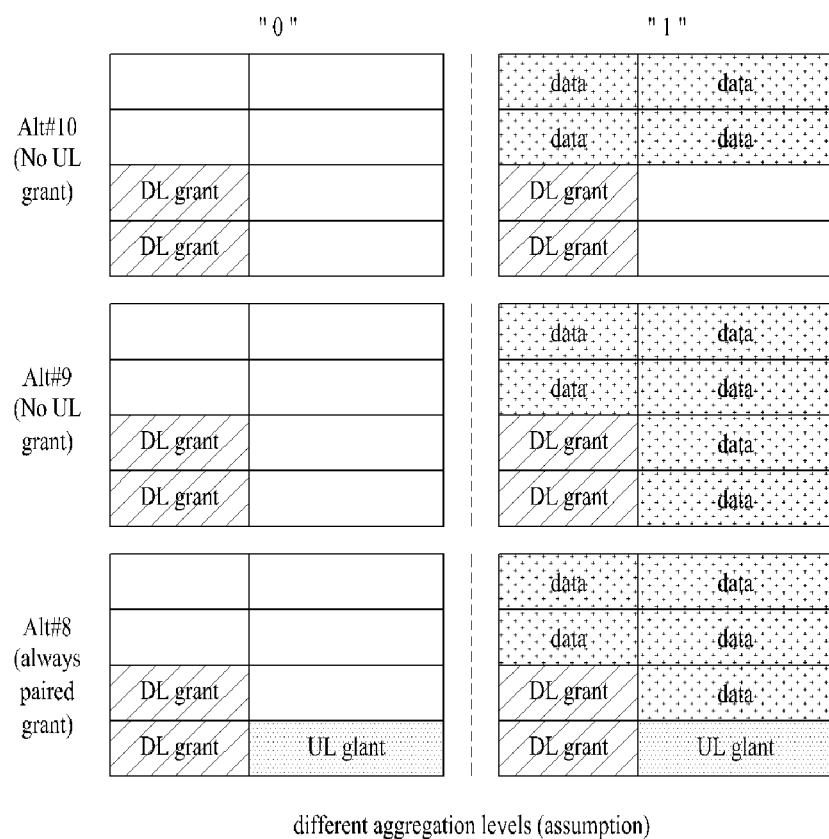

FIGS. 41 and 42 show other rules for placing an R-PDCCH/data. In particular, if DL grant and UL grant are simultaneously present, Method #5 (Alt #5) and Method #8 (Alt #8) may be applied and, if only DL grant is present (that is, UL is not present), Method #6 (Alt #6), Method #7 (Alt #7), Method #9 (Alt #9) and Method #10 (Alt #10) may be applied. Two cases will be described as follows:

(a) Case in which DL grant is present and UL grant is always present (b) Case in which only DL grant is present and UL grant is not present Method #5 (Alt #5) and Method #8 (Alt #8) are used in case of (a) and Method #6 (Alt #6), Method #7 (Alt #7), Method #9 (Alt #9) and Method #10 (Alt #10) are used in case of (b). Assuming that (a) and (b) coexist, a set is defined in advance such that one of the methods applied to (a) is used in a specific subframe in which (a) occurs and one of the methods applied to (b) is used in a specific subframe in which (b) occurs, and is configured through signaling. For example, placement of R-PDCCHs and data is checked according to Method #5 in case of (a) and placement of R-PDCCHs is checked according to Method #6 in case of (b). At this time, Method #5 and Method #6 may be grouped to one set and may be configured through signaling. As another method, Mode 1 using only (a) and Mode 2 using both (a) and (b) may be set and configured through signaling. In general, in consideration of symmetric subframe allocation, a possibility wherein (a) occurs is high. In a TDD structure, (b) may frequently occur. In addition, a method of using both Mode 1 (e.g., Method #5) and Mode 2 (e.g., Methods #5 and Method #6) may be used. Mode 1 and Mode 2 may be automatically applied according to subframe type. The subframe may be implicitly checked according to a subframe allocation pattern or a subframe index. If various methods are applied (e.g., Mode 2—Method #5 and Method #6) in one mode, Method #5 and Method #6 may be distinguished in Mode 2 depending on blind decoding. In Mode 2, Method #5 and Method #6 may be distinguished through L1/L2 or higher layer signaling or may be implicitly checked according to subframe allocation pattern or subframe index.

Index Ordering for Maximizing Backhaul Resources

In the following description, the following assumption is given in order to use backhaul resources. For description, it is assumed that R-PDCCH (or relay) groups 0, 1 and 2 are present. In this case, since a relay assumes that an R-PDCCH is always present in a first slot of an RB pair in a group (e.g., the group 1) to which the relay belongs, only a second slot of the RB pair may be used to transmit the R-PDCCH. If the R-PDCCH is transmitted using an RB pair of another group (the group 0 or 2) (that is, if an RA indication is present), it is assumed that not only the second slot but also the first slot may be used to transmit the R-PDCCH. This is because the relay interprets an RA indication bit while distinguishing between the group to which the relay belongs and the group to which the relay does not belong.

Figure 43:
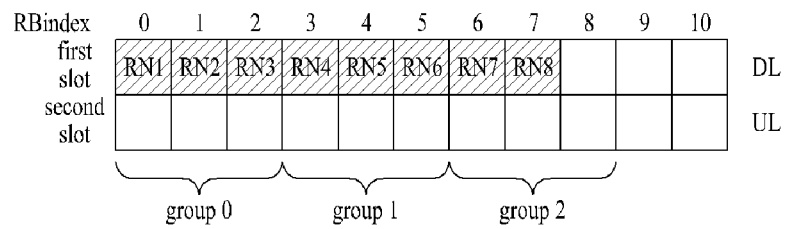
FIGS. 43 to 46 are diagrams showing a method of ordering indexes of relay physical downlink control channels (R-PDCCHs) and a resource allocation example thereof.

FIG. 43 shows an example of placing R-PDCCHs according to group index order. In FIG. 43, it is assumed that an RBG is composed of four RBs and a total number of R-PDCCHs is 8.

Referring to FIG. 43, eight R-PDCCHs (RN1 to RN8) may be contiguously placed from an RB index 0 according to group index order (e.g., logical RB index order). In this case, RN4 belonging to a group 1 may not use a first slot of an RB pair belonging to a group 0. This is because RBs (RB indexes 0 to 2) before RN4 of the group 1 are filled with R-PDCCHs of other RNs (RN1 to RN3). In this case, the above-described assumption (that is, the assumption that an R-PDCCH begins to be transmitted from the first slot if an RA indication is present in groups other than the group 1 to which RN4 belongs) is not suitable. Accordingly, as shown, a new rule is necessary if group index ordering is applied. A group index ordering method should be decided.

Figure 44:
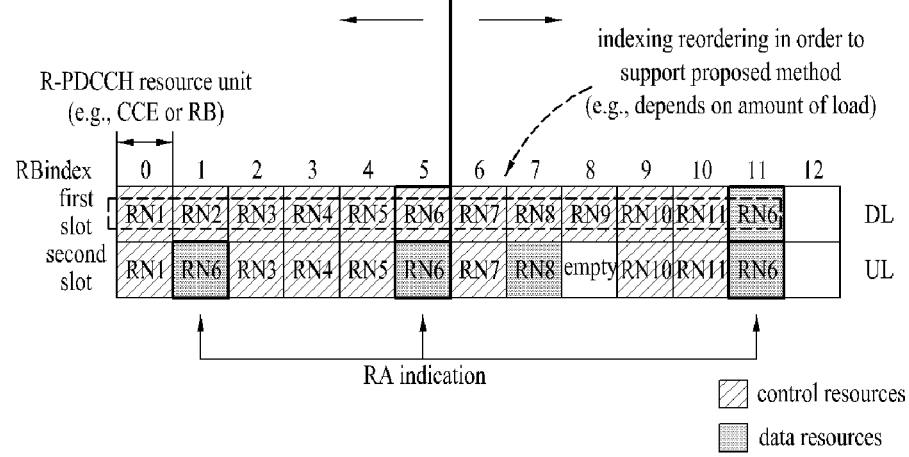
Figure 45:
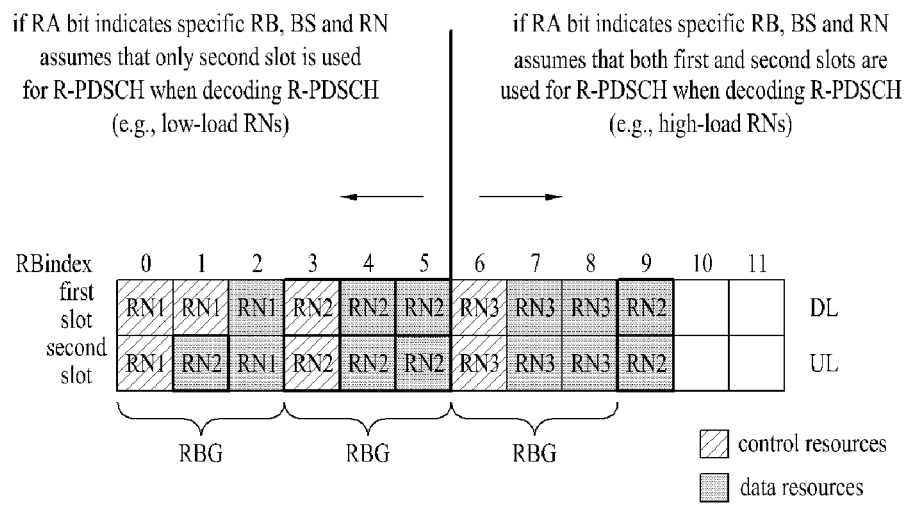
Figure 46:
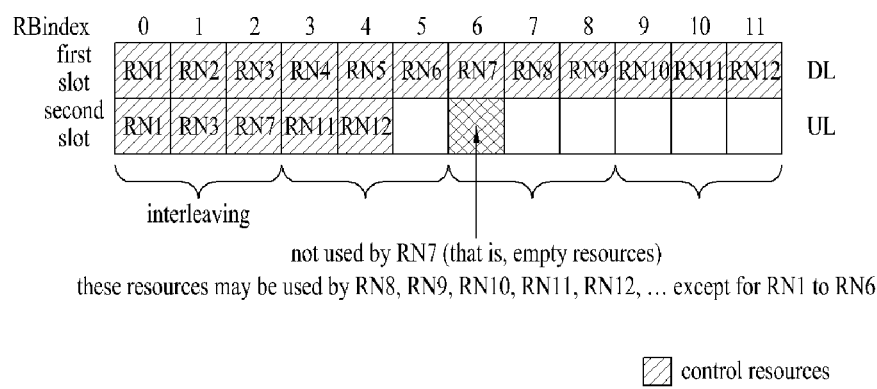

As one method, a high index value may be given to an RN to which a BS should transmit a relatively large amount of data (e.g., a group 2). In contrast, a relatively low index value may be given to an RN to which a BS should transmit a relatively small amount of data or an RN to which data is not transmitted (e.g., a DL grant only case). At this time, in order to accurately apply the rule, group index ordering may be preferentially performed according to the amount of data. In such alignment, the relay may differently interpret RA indication bits when resources allocated to an RB index lower than that of the relay are present and when resources allocated to an RB index higher than that of the relay are present, which are shown in FIGS. 44 to 46. FIGS. 44 to 46 show different states.

FIG. 44 shows a method of the case in which each RB means a logical RB and index or the case of allocating resources in units of one RB. FIG. 45 shows a method suitable for the case of allocating resources in RBG units. FIG. 45 shows the case in which UL grant is separately packed and is interleaved at a time or in group units having a predetermined size.

FIG. 44 shows the case in which a second slot of an RB pair in which DL grant of RN2 is present is empty (e.g., a DL grant alone case) and the case in which empty resources are used for RN6. FIG. 44 shows the case in which data for RN6 is transmitted even in an RB pair which is not used by an RN different from a second slot of an RB pair in which DL grant of RN6 is present, in addition to the above-described empty resources. That is, a larger amount of data is transmitted to RN6 as compared to RN1 or RN2. This is because it is assumed that group index ordering is performed according to the size of data to be transmitted to the relay. In this case, RA bit interpretation is differently set. That is, RA bits for RBs (RBs of the left direction) present before RN6 indicates only whether data is present in a second slot. This is because a first slot is occupied by RNs having low group indexes as in RN2. When the R-PDSCH of RN6 is allocated to RBs (RBs of the right direction) greater than an RB index in which RN6 is present, an RA bit indicates whether an R-PDCCH is present in both a first slot and a second slot. That is, the relay may perform decoding on the assumption that R-PDCCHs are transmitted at the second slot of the PR pair or all slots in consideration of a group index. The above assumption may be summarized as follows:

1. If an RA bit indicates data (e.g., (R-)PDSCH) allocation with respect to RB pair(s) occupied by an R-PDCCH (or an R-PDCCH group) of a relay and previous R-PDCCH(s) (or R-PDCCH group(s) in a search space, the relay assumes that DL grant is transmitted at the first slot of the RB pair and data thereof is transmitted at the second slot. Accordingly, the relay performs (R-)PDSCH decoding on the assumption that data is not transmitted in the first slot of the RB pair.

2. If an RA bit indicates data (e.g., (R-)PDSCH allocation with respect to RB pair(s) next to the RB pair(s) occupied by the R-PDCCH of the relay in the search space, the relay assumes that data is transmitted in both the first and second slots of the RB pair. Accordingly, the relay performs (R-)PDSCH decoding on the assumption that data is transmitted in both the first and second slots of the RB pair.

According to the present proposal, the relay does not need to know how many RBs are used by the R-PDCCHs in a given subframe or how many R-PDCCHs are present.

FIG. 45 shows the case of introducing the RBG concept. If resources are allocated in RBG units, only PRBs belonging to the RBG may not be used. As the number of unusable RBs is increased, the above method enables efficient use of backhaul resources. FIG. 45 shows the case in which 1 RB of an RBG to which RN belongs is used for RN2 and R-PDSCHs for RN2 are transmitted in an RB pair in which an R-PDCCH of the RN as well as an RBG to which RN2 belongs are not present. In this case, RA bit interpretation for the RBG index having an index lower than that of an RBG to which RN2 belongs and RA bit interpretation for a PRB having an index grater than that of the RBG to which RN2 belongs are different.

FIG. 46 shows an example of packing UL grant with lower indexes if UL grant is less than DL grant. By this configuration, all RBs except for RBs occupied by UL grant may be used for the proposed rule.

The above description focuses upon a relationship between a BS and an RN, but is equally/similarly applied to a relationship between an RN and a UE. For example, in the above description, a BS may be replaced with an RN and an RN may be replaced with a UE.

Figure 47:
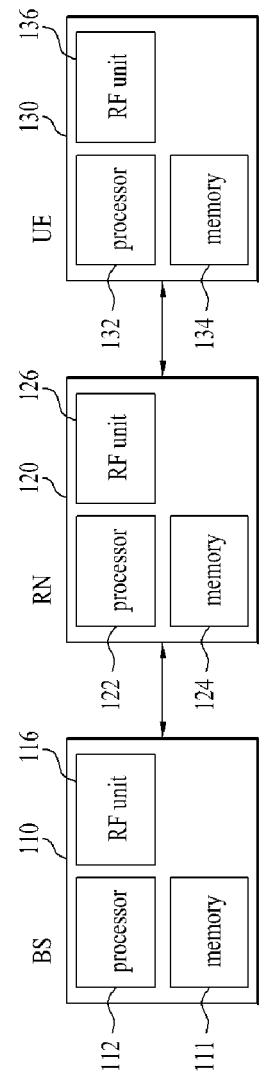
FIG. 47 is a diagram showing a base station, a relay node and a user equipment (UE).

FIG. 47 shows a BS, an RN and a UE to which the present invention is applicable.

Referring to FIG. 47, a radio communication system includes a BS 110, an RN and a UE 130. For convenience, although the UE is connected to the RN, the UE may be connected to the BS.

The BS 110 includes a processor 112, a memory 114 and a radio frequency (RF) unit 116. The processor 112 is configured to implement the procedures and/or methods of the present invention. The memory 114 is connected to the processor 112 so as to store a variety of information associated with the operation of the processor 112. The RF unit 116 is connected to the processor 112 so as to transmit and/or receive an RF signal. The RN 120 includes a processor 122, a memory 124 and a radio frequency (RF) unit 126. The processor 122 is configured to implement the procedures and/or methods of the present invention. The memory 124 is connected to the processor 122 so as to store a variety of information associated with the operation of the processor 122. The RF unit 126 is connected to the processor 122 so as to transmit and/or receive an RF signal. The UE 130 includes a processor 132, a memory 134 and a radio frequency (RF) unit 136. The processor 132 is configured to implement the procedures and/or methods of the present invention. The memory 134 is connected to the processor 132 so as to store a variety of information associated with the operation of the processor 132. The RF unit 136 is connected to the processor 132 so as to transmit and/or receive an RF signal. The BS 110, the RN 120 and/or the UE 130 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention are disclosed on the basis of a data communication relationship among a base station, an RN and a UE. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "terminal" may also be replaced with a User Equipment (UE), a Mobile Station (MS) or a Mobile Subscriber Station (MSS) as necessary.

The embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention relates to a radio communication system and is applicable to a base station, a relay node and a user equipment.

What is claimed is:

1. A method for receiving a relay physical downlink control channel (R-PDCCH) at a relay in a wireless communication system, the method comprising:

monitoring, by the relay, first control information for downlink scheduling in a first slot of one of resource block (RB) pairs to detect the first control information, wherein the first control information includes allocation information on one or more resource units;

receiving, by the relay, data for the first control information under assumption that the data exists in a second slot of one of the RB pairs and the first slot of the RB pairs is not used for physical downlink shared channel (PDSCH) transmission, when the first control information is detected in the first slot of the one of the RB pairs, wherein the one of the RB pairs overlaps the one or more resource units; and monitoring, by the relay, second control information in the second slot of the one of the RB pairs, wherein if the R-PDCCH is assigned to the second slot of the RB pair, the R-PDCCH is configured to carry control information for uplink scheduling, and wherein the R-PDCCH is configured to be non-interleaving by high layer signaling.

2. The method of claim 1, wherein if the R-PDCCH is assigned to the first slot of the one of the RB pairs, the R-PDCCH is configured to carry control information for downlink scheduling.

3. The method of claim 1, wherein the first control information is a downlink assignment.

4. The method of claim 1,
wherein the relay monitors the second control information in the second slot of the one of the RB pairs, when the first control information is not detected in the first slot of the one of the RB pairs, and
wherein the second control information is an uplink grant.

5. A relay for receiving a relay physical downlink control channel (R-PDCCH) in a wireless communication system, the relay comprising:
a transceiver; and
a processor configured to:
control the transceiver to monitor first control information for downlink scheduling in a first slot of one of resource block (RB) pairs to detect the first control information, wherein the first control information includes allocation information on one or more resource units,
control the transceiver to receive data for the first control information under assumption that the data exists in a second slot of one of the RB pairs and the first slot of the RB pairs is not used for physical downlink shared channel (PDSCH) transmission, when the first control information is detected in the first slot of the one of the RB pairs,
wherein the one of the RB pairs overlaps the one or more resource units, and
control the transceiver to monitor second control information in the second slot of the one of the RB pairs,
wherein if the R-PDCCH is assigned to the second slot of the RB pair, the R-PDCCH is configured to carry control information for uplink scheduling, and
wherein the R-PDCCH is configured to be non-interleaving by high layer signaling.

* * * * *